US012605808B2

(12) United States Patent
Suzuki et al.

(10) Patent No.: US 12,605,808 B2
(45) Date of Patent: Apr. 21, 2026

(54) POWER TOOL

(71) Applicant: MAKITA CORPORATION, Anjo (JP)

(72) Inventors: Yuta Suzuki, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 23 days.

(21) Appl. No.: 18/387,533

(22) Filed: Nov. 7, 2023

(65) Prior Publication Data

US 2024/0238948 A1 Jul. 18, 2024

(30) Foreign Application Priority Data

Jan. 18, 2023 (JP) ................................ 2023-005706

(51) Int. Cl.
*B25F 5/02* (2006.01)
*B25B 21/02* (2006.01)
*B25F 5/00* (2006.01)

(52) U.S. Cl.
CPC .............. *B25B 21/02* (2013.01); *B25F 5/001* (2013.01); *B25F 5/006* (2013.01); *B25F 5/02* (2013.01)

(58) Field of Classification Search
CPC .................................... B25F 5/00; B25F 5/02
See application file for complete search history.

(56) References Cited

U.S. PATENT DOCUMENTS 6,840,335 B1 * 1/2005 Wu ........................... B25F 5/02 173/217
7,766,097 B2 * 8/2010 Kondo .................... B25F 5/006 173/171
7,944,174 B2 * 5/2011 Casalena ................... H02J 7/70 320/112
8,557,427 B2 * 10/2013 Matsumoto ............... B25F 5/02 429/151
8,708,063 B2 * 4/2014 Nagasaka ................. B25F 5/02 173/217
8,733,471 B2 * 5/2014 Nagasaka ................. B25F 5/02 173/217
9,461,281 B2 * 10/2016 Wackwitz ......... H01M 10/0525
9,660,229 B2 * 5/2017 Chellew .............. H01M 50/247
10,661,426 B2 * 5/2020 Aoki ....................... B25F 5/006
11,837,741 B2 * 12/2023 Murakami ................ B25F 5/02
2005/0058890 A1 * 3/2005 Brazell ................... B25F 5/006 429/97
2013/0269965 A1 * 10/2013 Shuang ..................... B25F 5/02 173/217
2015/0214520 A1 * 7/2015 Nishikawa .......... H01M 50/247 429/100
2015/0328764 A1 * 11/2015 Yoshikane ............. B25D 16/00 173/104
2018/0108884 A1 * 4/2018 Chen .................. H01M 50/213

(Continued)

*Primary Examiner* — Gloria R Weeks
(74) *Attorney, Agent, or Firm* — Oliff PLC

(57) ABSTRACT

A power tool isolates a battery pack from vibrations. A power tool includes a motor, a main housing accommodating the motor, a first elastic member supported by the main housing, a battery housing supported by the first elastic member, a battery holder to which a battery pack is attachable and that is movably supported by the battery housing, and a second elastic member that restricts relative movement of the battery housing and the battery pack attached to the battery holder.

17 Claims, 30 Drawing Sheets

(56) References Cited

U.S. PATENT DOCUMENTS

| | | | | |
|---|---|---|---|---|
| 2018/0126534 A1* | 5/2018 | Iida | ........................ | B25D 11/12 |
| 2020/0215679 A1* | 7/2020 | Tamura | ..................... | B25F 5/02 |
| 2021/0234225 A1* | 7/2021 | Takeda | ................ | H01M 50/258 |
| 2021/0237249 A1* | 8/2021 | Fischer | ..................... | B25F 5/02 |

* cited by examiner

POWER TOOL

CROSS-REFERENCE TO RELATED APPLICATIONS

This application claims the benefit of priority to Japanese Patent Application No. 2023-005706, filed on Jan. 18, 2023, the entire contents of which are hereby incorporated by reference.

BACKGROUND

1. Technical Field

The present disclosure relates to a power tool.

2. Description of the Background

In the technical field of power tools, an impact tool is known as described in U.S. Patent Application Publication No. 2021/0237249. The impact tool includes a motor, a housing accommodating the motor, a battery receptacle including an isolation member, and an elastomeric damper. The isolation member, which can receive a battery pack, includes rails. The rails are slidably supported in channels in the housing. Upon receiving a shock, the isolation member moves along the housing and strikes the elastomeric damper. The isolation member also reduces transmission of vibrations from the housing.

BRIEF SUMMARY

Elastic members may typically have low hardness to absorb vibrations. However, when a tool including an elastic member with low hardness receives a shock, the elastic member can easily be compressed and cannot fully absorb the shock. To absorb the shock, the elastic member is to have a certain degree of hardness.

A known impact tool includes an elastomeric damper in a housing to absorb a shock and to reduce vibrations. The use of an elastomeric damper with lower hardness to reduce vibration may cause a battery pack to be displaced greatly in a tool upon receiving, for example, a shock from a drop. The battery pack may then come in direct contact with the housing and break. An elastomeric damper with hardness high enough for shock absorption may have lower vibration reduction capability, and vibrations during operation may cause the terminal unit on the battery pack to break.

The known impact tool also includes a battery holder with rails supported by rails on a main housing in a manner translatable in the front-rear direction of a main body, which is the same direction as the direction in which the battery pack is inserted or removed. The main housing includes a rubber portion. The battery holder moving in the front-rear direction comes in contact with the rubber portion, reducing a shock. In this structure, however, the battery holder is movable in the front-rear direction alone and cannot move in the vertical and lateral directions. Thus, the components of practical vibrations of the tool in the vertical and lateral directions are not absorbed, and the vibrations directly affect the battery pack or its terminals, causing early wear of the terminals.

One or more aspects of the present disclosure are directed to a power tool that isolates a battery pack from vibrations.

A first aspect of the present disclosure provides a power tool, including:

a motor;

a main housing accommodating the motor;

a first elastic member supported by the main housing;

a battery housing supported by the first elastic member;

a battery holder to which a battery pack is attachable, the battery holder being movably supported by the battery housing; and a second elastic member configured to restrict relative movement of the battery housing and the battery pack attached to the battery holder.

A second aspect of the present disclosure provides a power tool, including:

a motor;

a striker in front of the motor;

an anvil strikable by the striker in a rotation direction;

a D-shaped handle behind the motor;

a battery holder to which a battery pack is attachable;

a battery housing connected to the D-shaped handle, the battery housing supporting the battery holder; and a rubber buffer supported by the battery housing and to be in contact with the battery pack.

A third aspect of the present disclosure provides a power tool, including:

a motor;

a main housing accommodating the motor; and a battery holder to which a battery pack is attachable, the battery holder being supported by the main housing with an elastic member in between, the elastic member being a rod extending in three directions different from one another.

The power tool according to the above aspects of the present disclosure can isolate the battery pack from vibrations.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an impact tool 1. The lateral direction, the front-rear direction, and the vertical direction are orthogonal to one another.

The impact tool 1 includes a motor 10 and an anvil 16 that is an output unit of the impact tool 1. The rotation axis of the motor 10 is referred to as a motor rotation axis MX for convenience. The rotation axis of the anvil 16 is referred to as an output rotation axis AX for convenience. The motor rotation axis MX extends vertically. The output rotation axis AX extends in the front-rear direction.

A direction parallel to the output rotation axis AX is referred to as an axial direction or axially for convenience. A direction about the output rotation axis AX is referred to as a circumferential direction or circumferentially, or a rotation direction for convenience. A direction radial from the output rotation axis AX is referred to as a radial direction or radially for convenience. A position nearer the output rotation axis AX in the radial direction, or a radial direction toward the output rotation axis AX, is referred to as radially inward for convenience. A position farther from the output rotation axis AX in the radial direction, or a radial direction away from the output rotation axis AX, is referred to as radially outward for convenience.

Impact Tool

Figure 1:
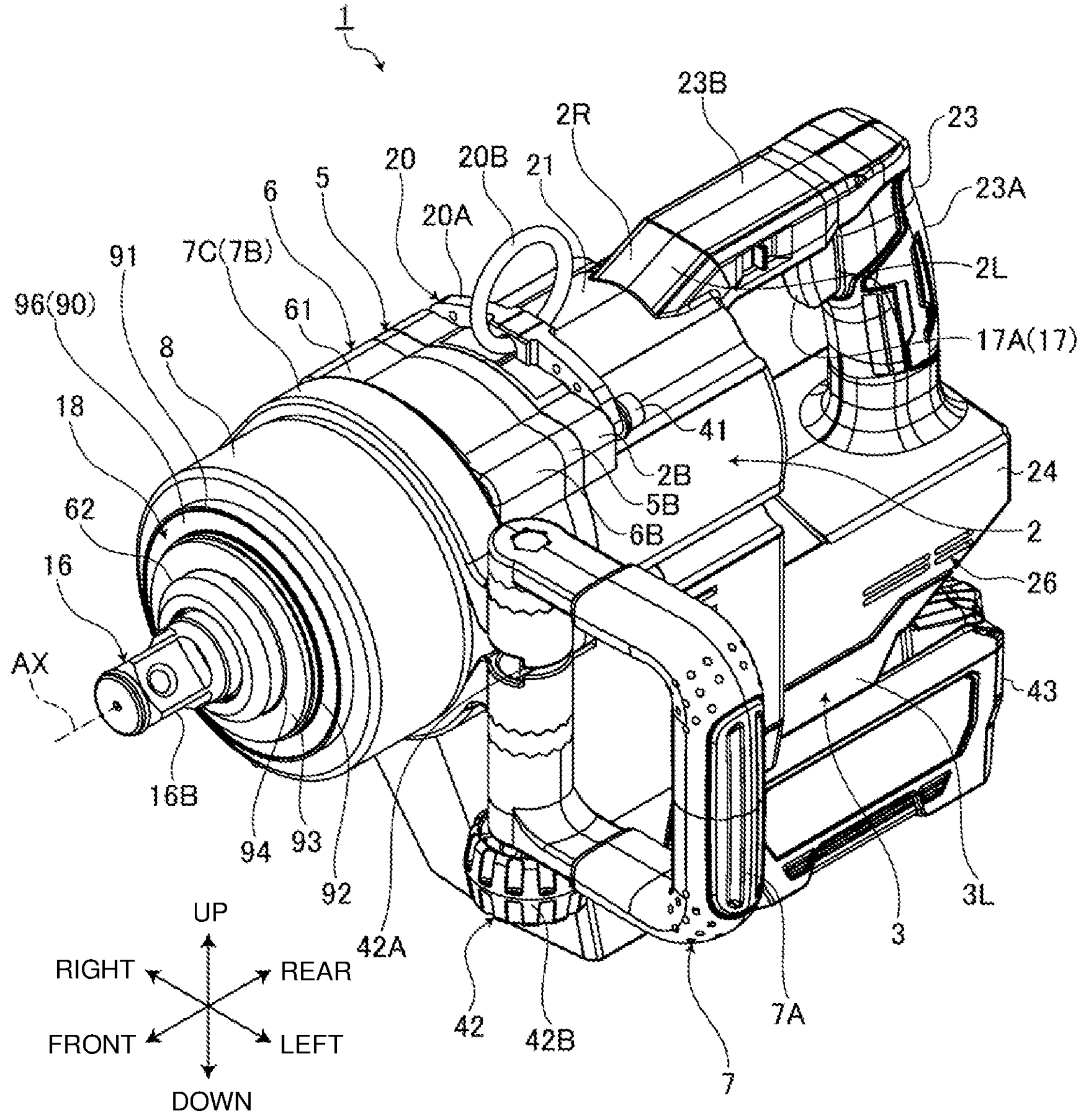
FIG. 1 is a perspective view of an impact tool according to an embodiment as viewed from the left front.
Figure 2:
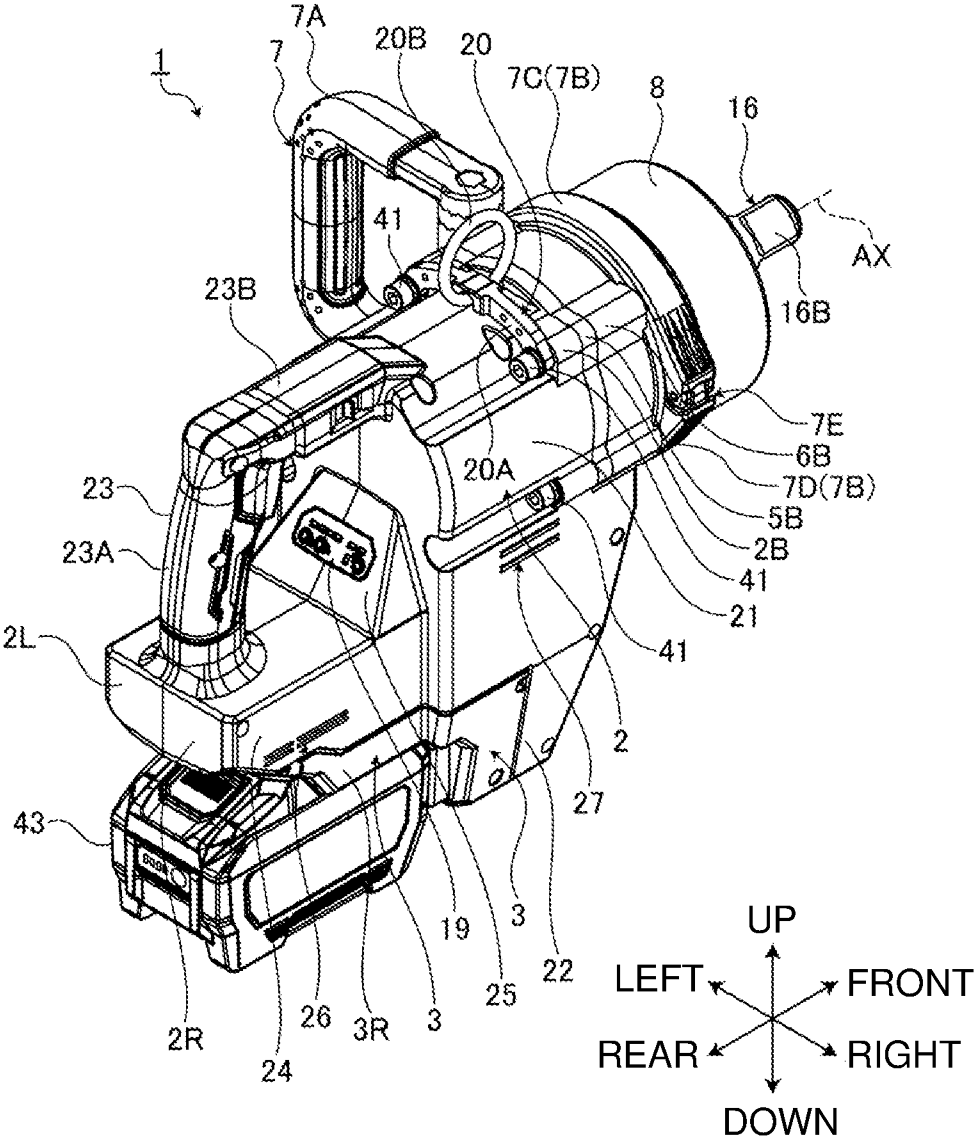
FIG. 2 is a perspective view of the impact tool according to the embodiment as viewed from the right rear.
Figure 3:
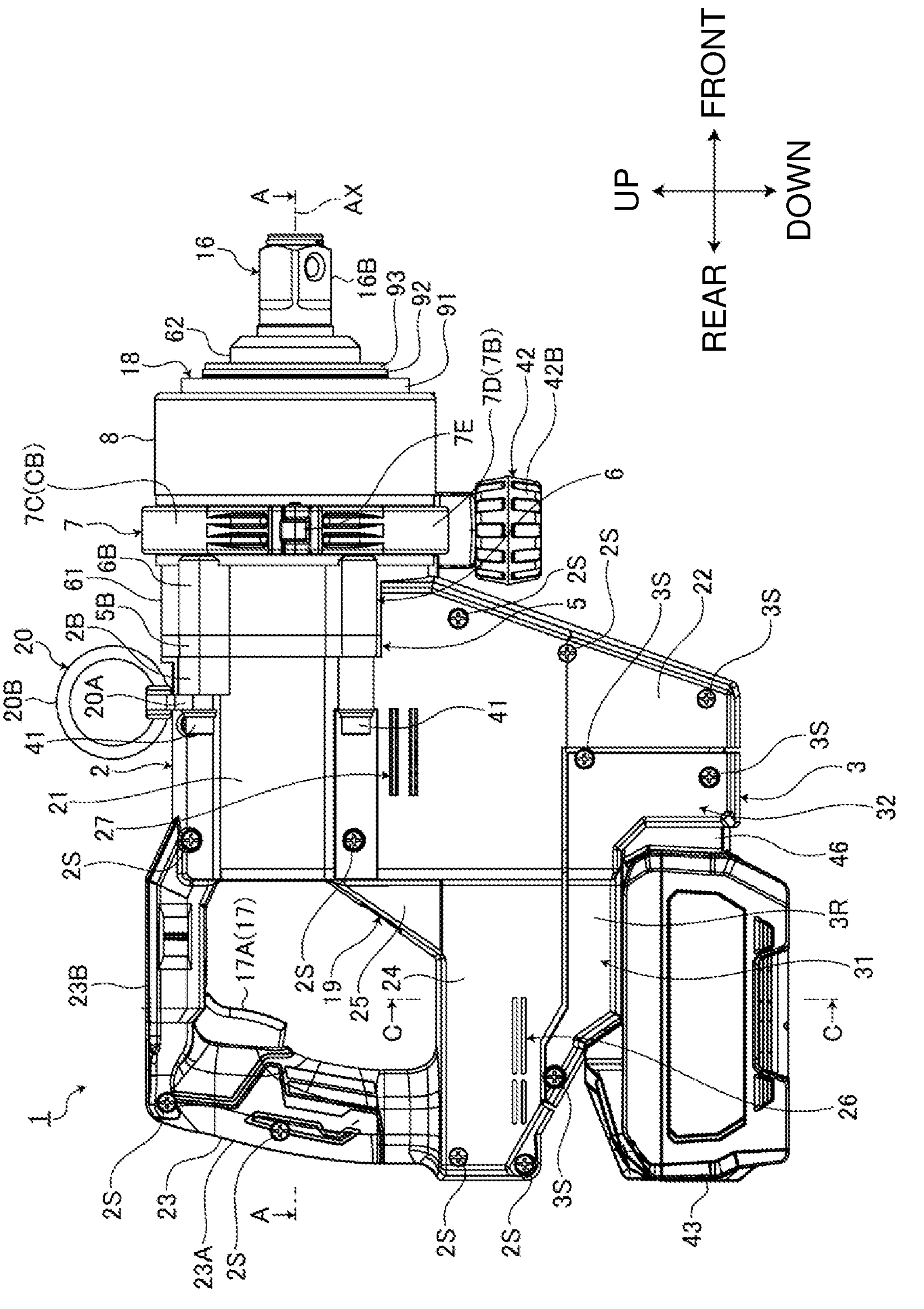
FIG. 3 is a right side view of the impact tool according to the embodiment.
Figure 4:
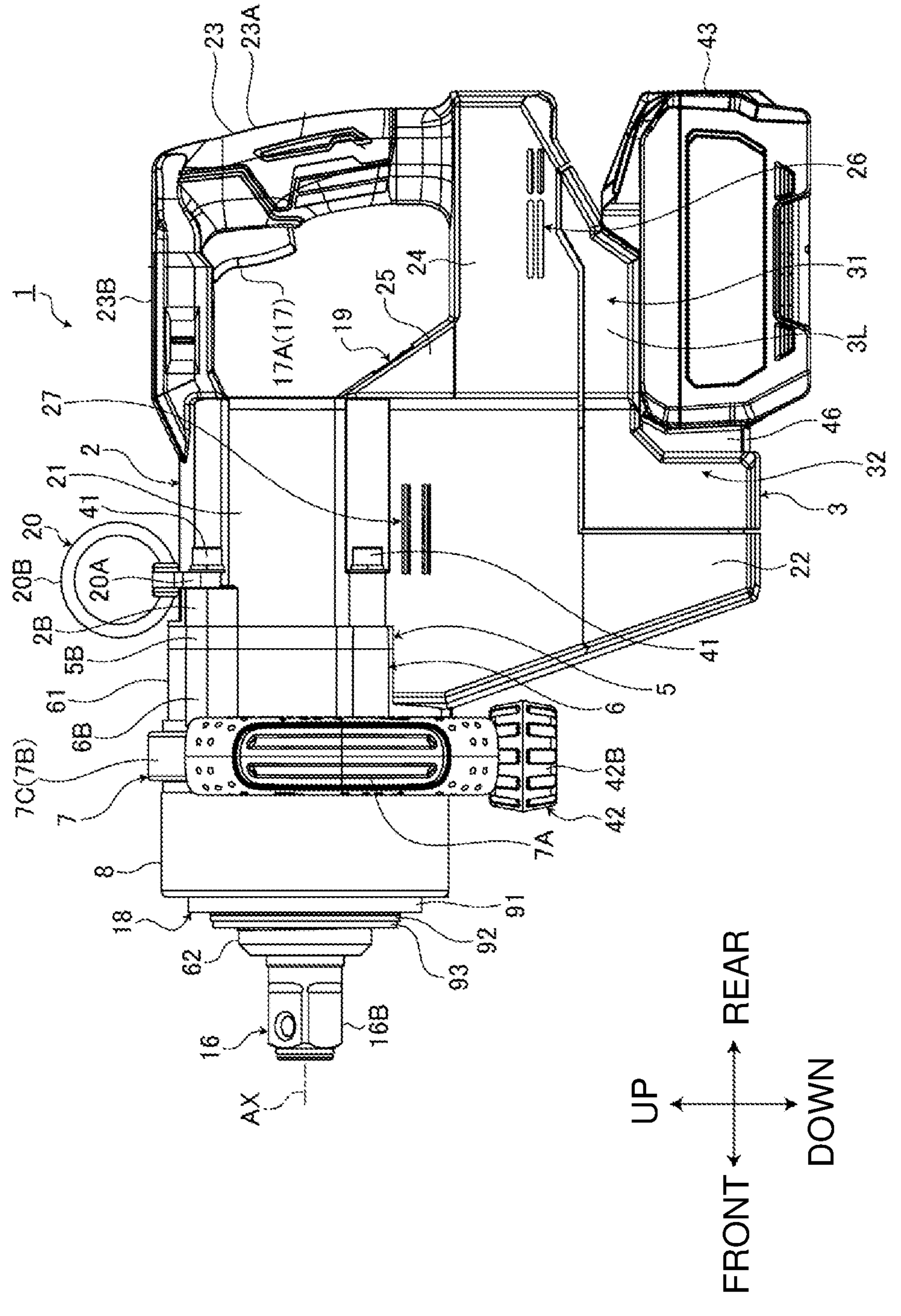
FIG. 4 is a left side view of the impact tool according to the embodiment.
Figure 5:
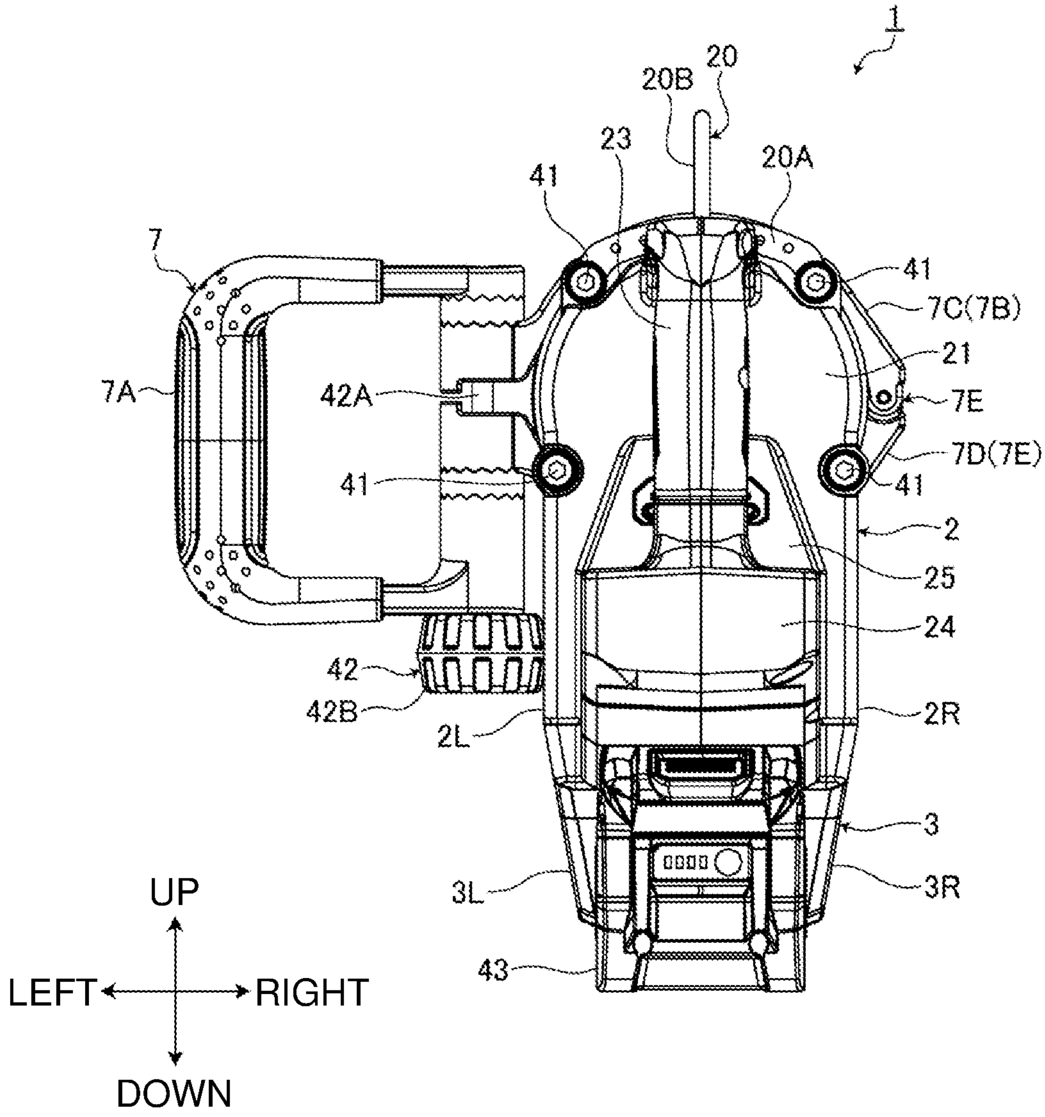
FIG. 5 is a rear view of the impact tool according to the embodiment.
Figure 6:
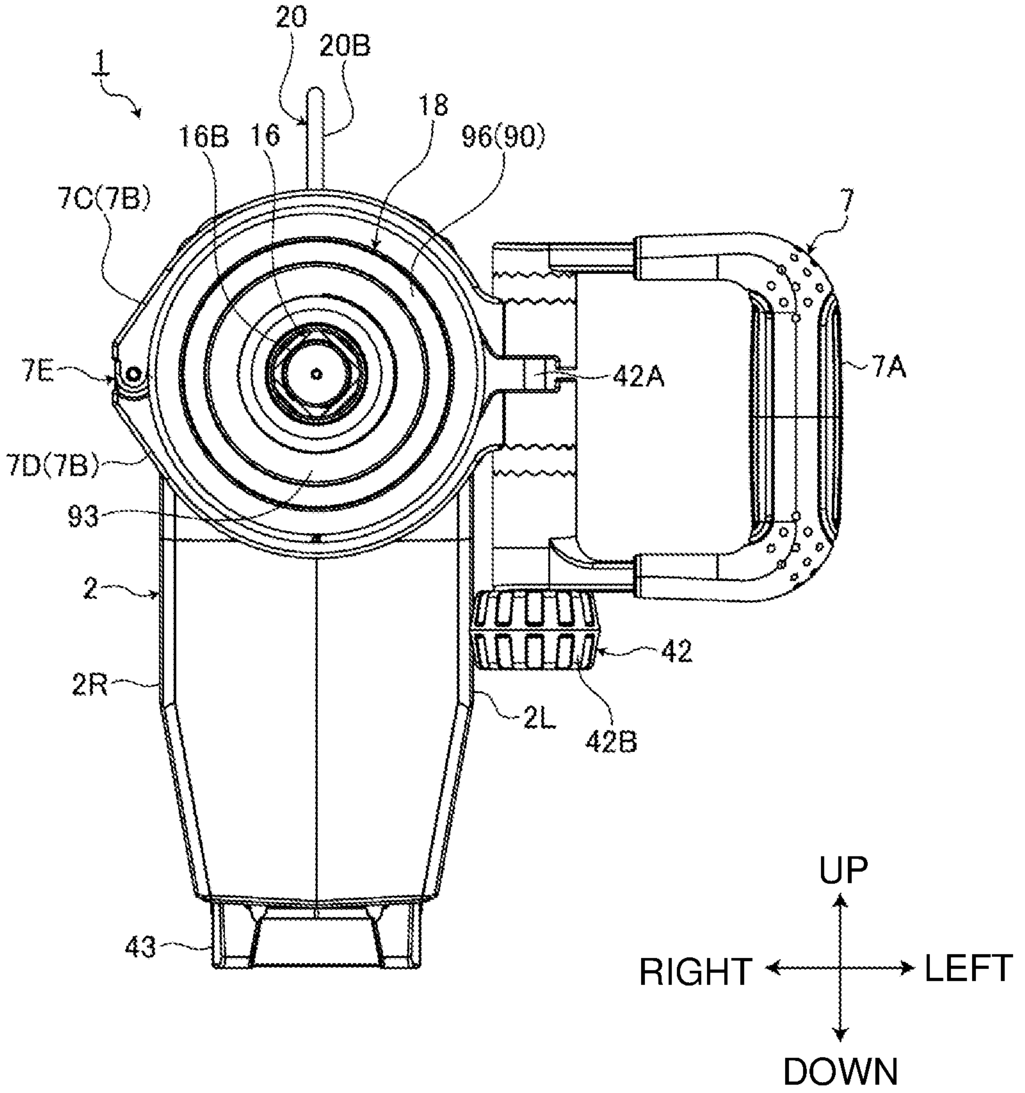
FIG. 6 is a front view of the impact tool according to the embodiment.
Figure 7:
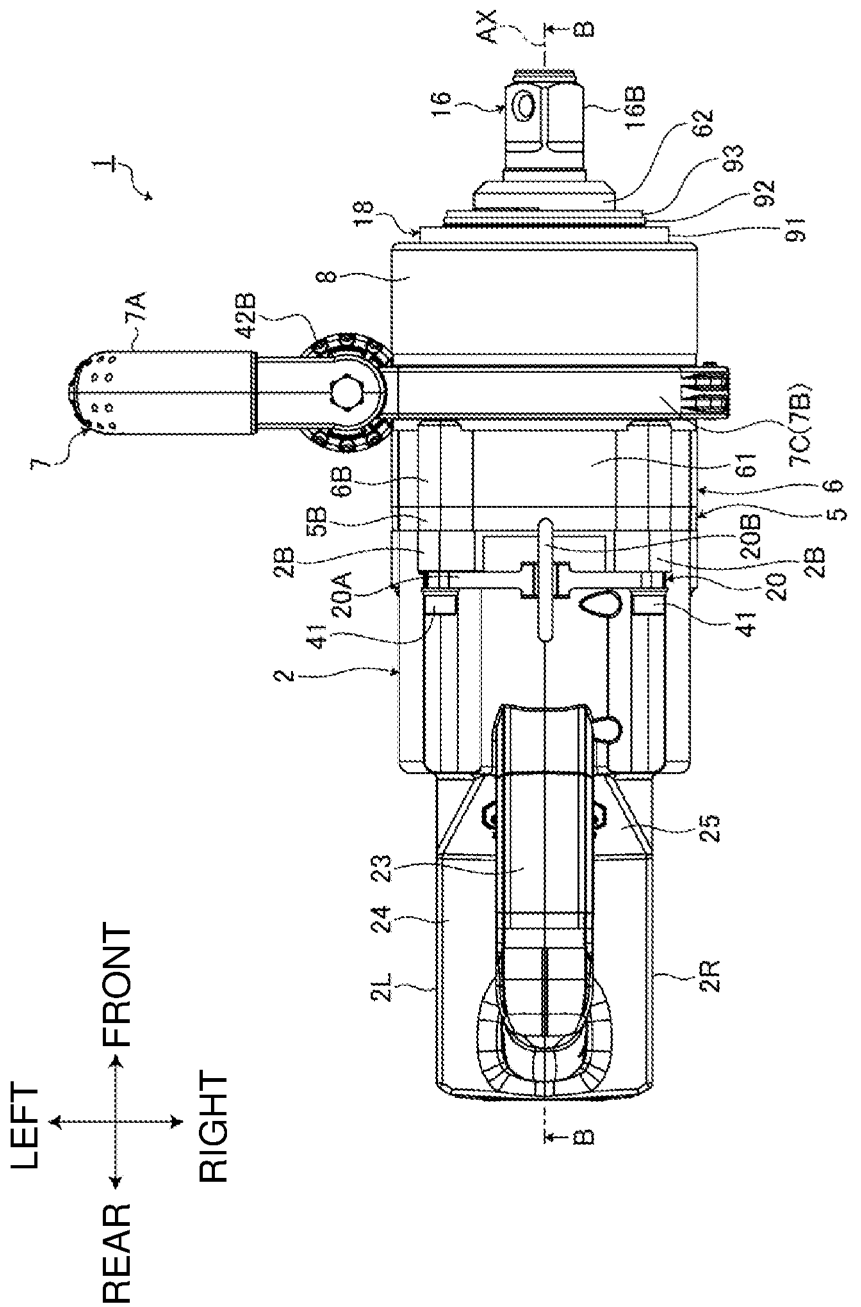
FIG. 7 is a top view of the impact tool according to the embodiment.
Figure 8:
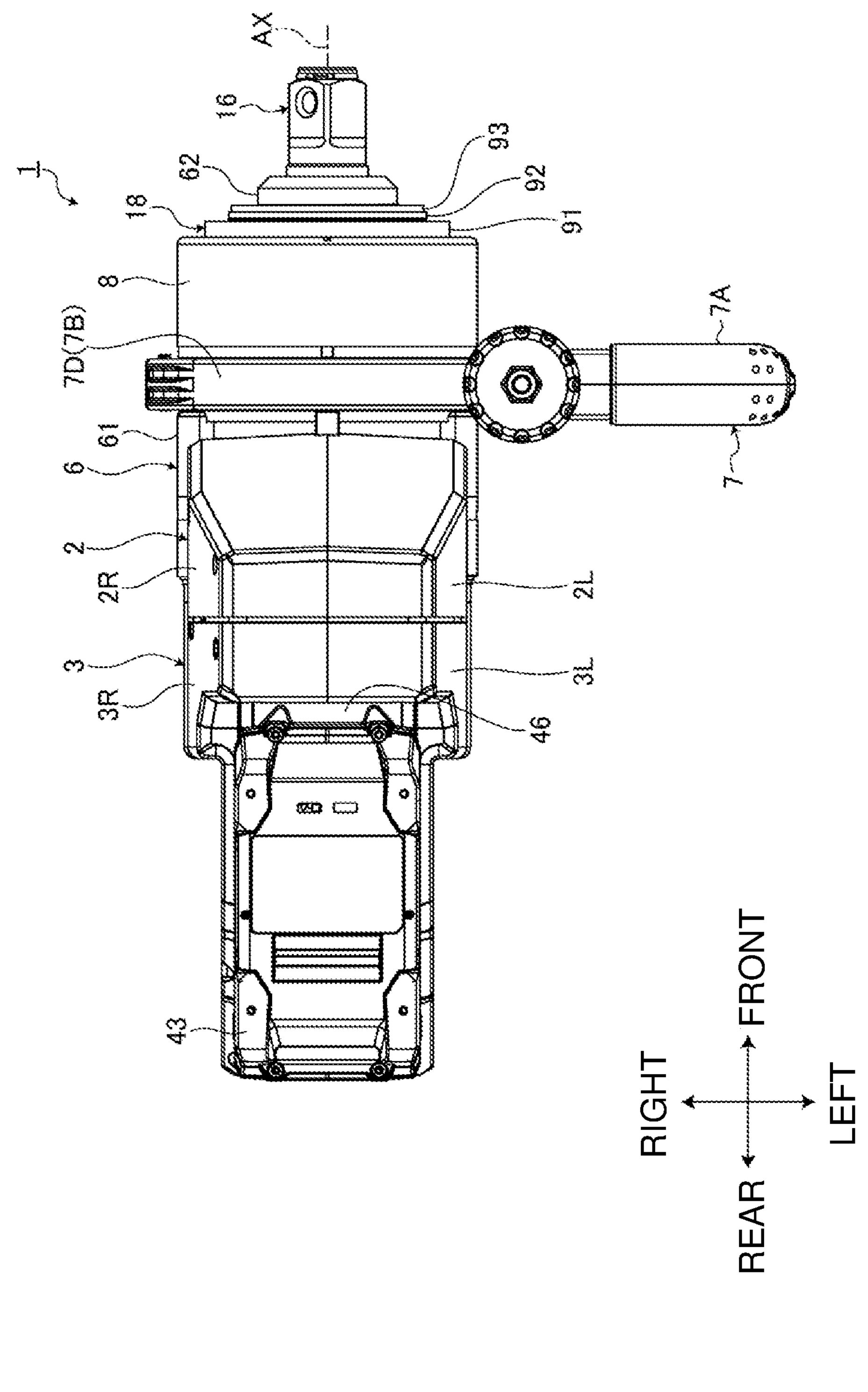
FIG. 8 is a bottom view of the impact tool according to the embodiment.
Figure 9:
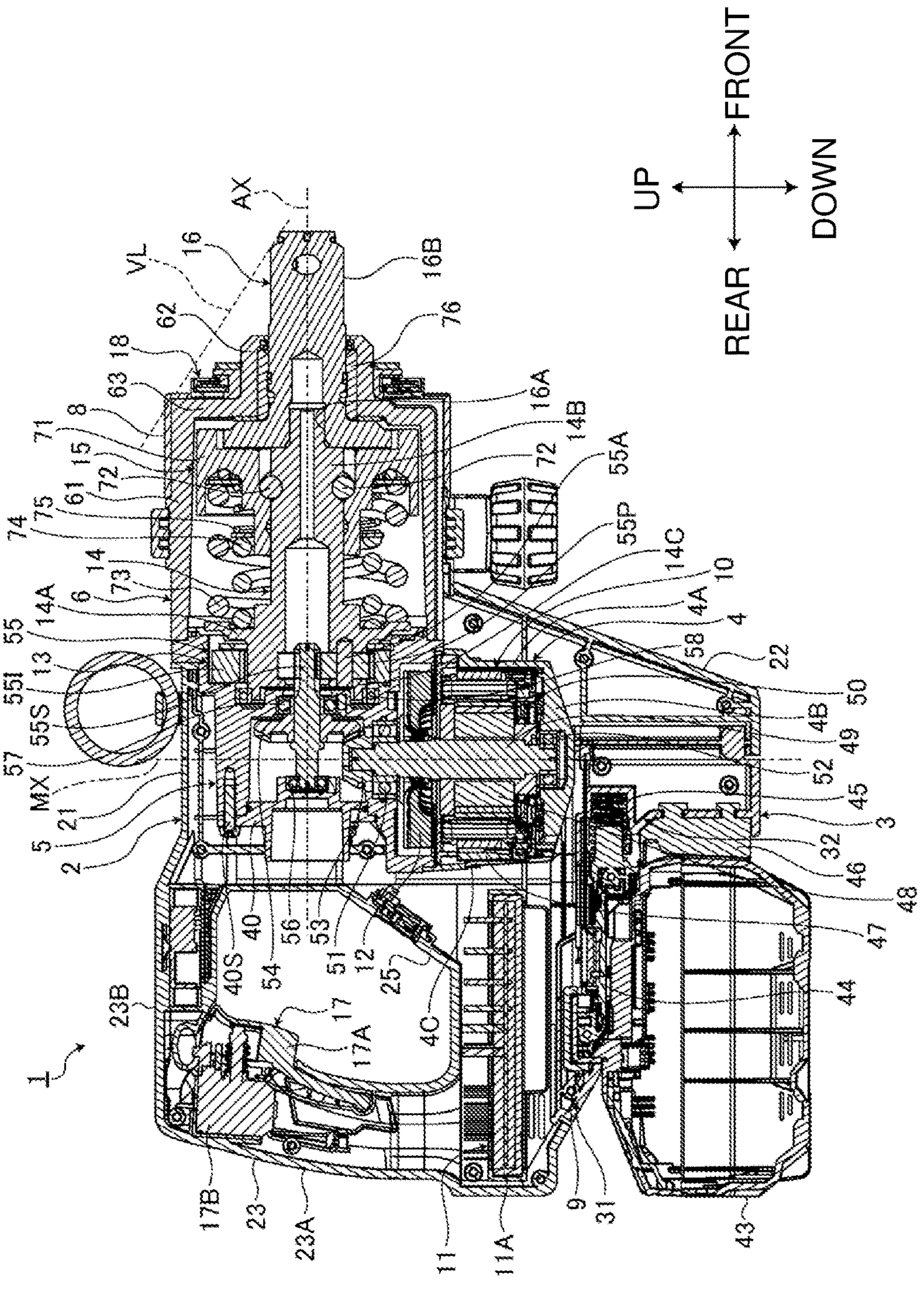
FIG. 9 is a sectional view of the impact tool according to the embodiment.
Figure 10:
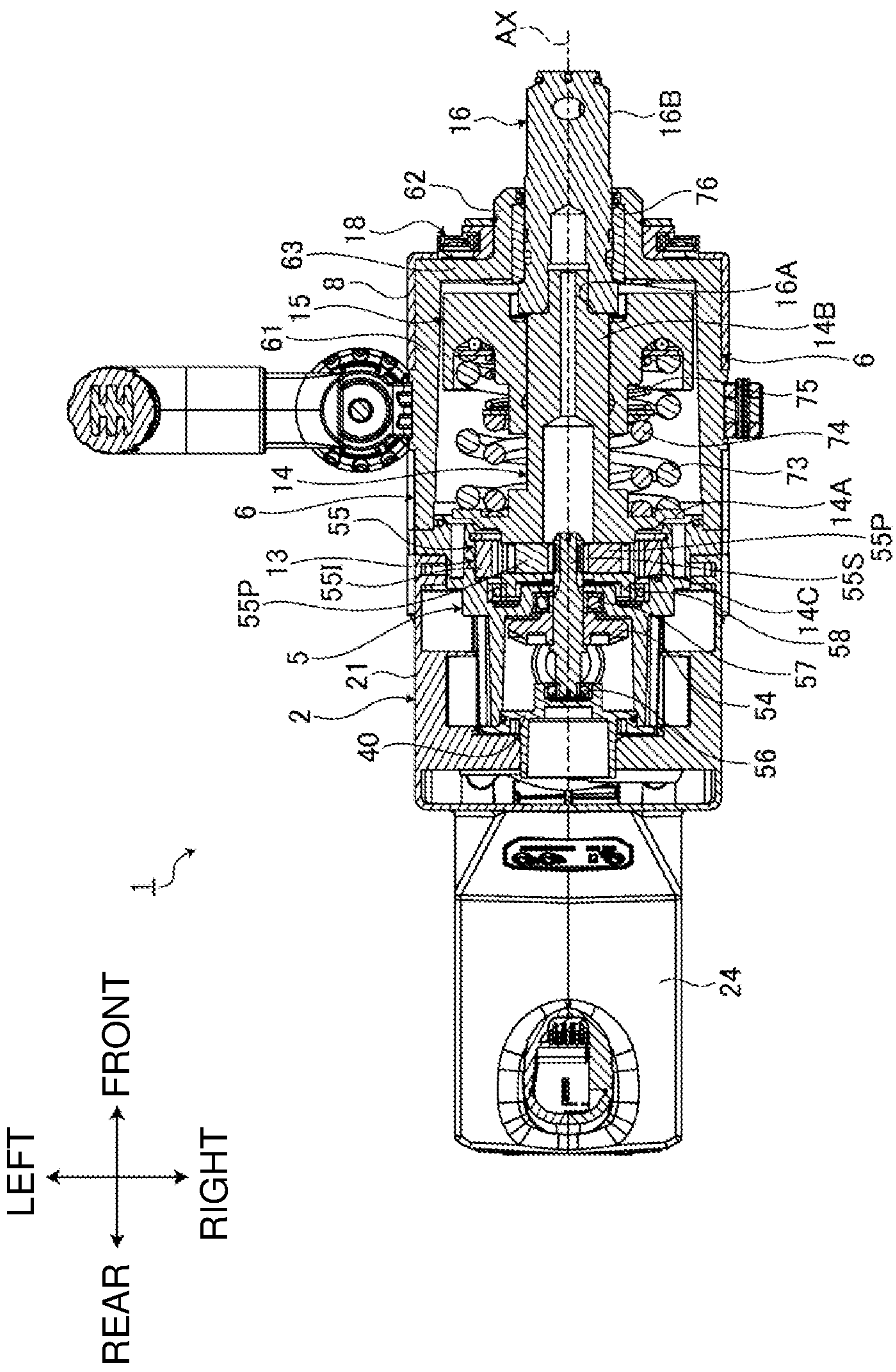
FIG. 10 is a sectional view of the impact tool according to the embodiment.
Figure 11:
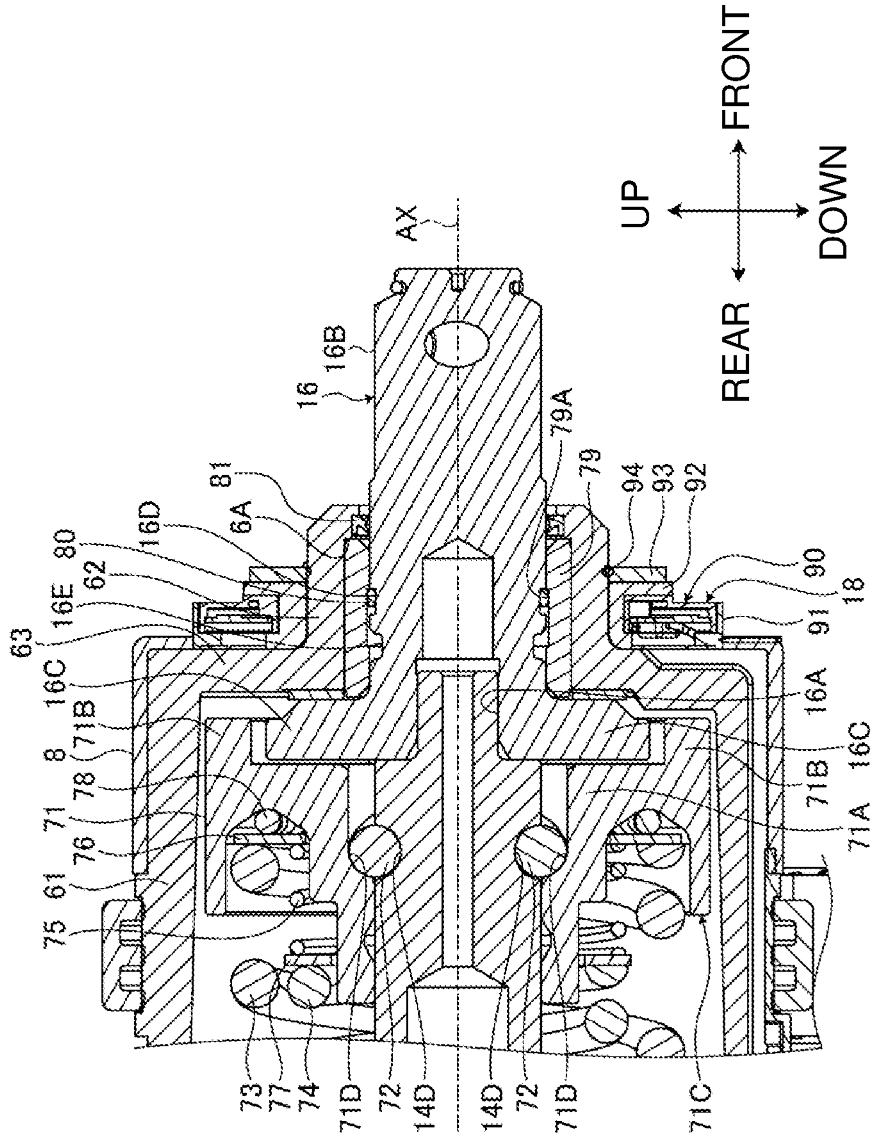
FIG. 11 is a partial sectional view of the impact tool according to the embodiment.
Figure 12:
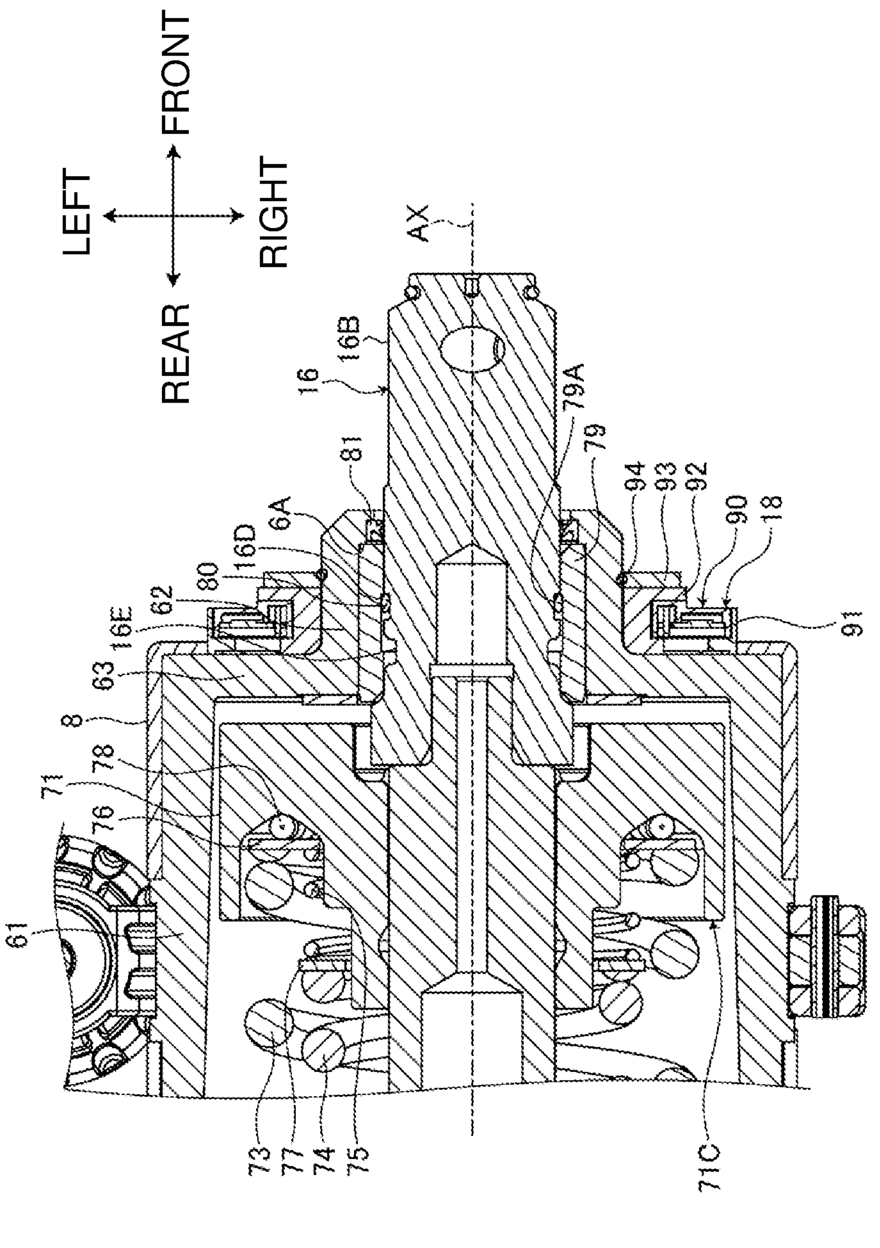
FIG. 12 is a partial sectional view of the impact tool according to the embodiment.

FIG. 1 is a perspective view of the impact tool 1 according to an embodiment as viewed from the left front. FIG. 2 is a perspective view of the impact tool 1 as viewed from the right rear. FIG. 3 is a right side view of the impact tool 1. FIG. 4 is a left side view of the impact tool 1. FIG. 5 is a rear view of the impact tool 1. FIG. 6 is a front view of the impact tool 1. FIG. 7 is a top view of the impact tool 1. FIG. 8 is a bottom view of the impact tool 1. FIG. 9 is a sectional view of the impact tool 1, taken along line B-B as viewed in the direction indicated by the arrows in FIG. 7. FIG. 10 is a sectional view of the impact tool 1, taken along line A-A in FIG. 3 as viewed in the direction indicated by the arrows. FIG. 11 is a partial sectional view of the impact tool 1, corresponding to a partially enlarged view of FIG. 9. FIG. 12 is a partial sectional view of the impact tool 1, corresponding to a partially enlarged view of FIG. 10.

The impact tool 1 is a power tool powered by the electric motor 10. The impact tool 1 according to the embodiment is an impact wrench that is a fastening tool. The impact tool 1 includes a main housing 2, a battery housing 3, a motor case 4, a gear case 5, a hammer case 6, a side handle 7, a bumper 8, a battery holder 9, the motor 10, a controller 11, a fan 12, a reducer 13, a spindle 14, a striker 15, the anvil 16, a trigger switch 17, a light assembly 18, an interface panel 19, and a hook assembly 20.

The main housing 2 accommodates the motor case 4. The main housing 2 accommodates a part of the gear case 5. The main housing 2 is connected to the battery housing 3. The main housing 2 is fastened to the hammer case 6.

The main housing 2 is formed from a synthetic resin such as a nylon resin. The main housing 2 includes a left main housing 2L and a right main housing 2R. The right main housing 2R is located on the right of the left main housing 2L. The left main housing 2L and the right main housing 2R form a pair of housing halves. The left main housing 2L and the right main housing 2R are fastened together with multiple screws 2S.

The main housing 2 includes a body 21, a protruding portion 22, a grip 23, a controller compartment 24, and a panel holder 2S.

The body 21 accommodates the motor case 4. The body 21 accommodates a part of the gear case 5.

The protruding portion 22 protrudes downward from the body 21. The protruding portion 22 is located in front of the battery housing 3.

The grip 23 is grippable by an operator. The grip 23 is located behind the body 21. The grip 23 includes a rear grip 23A and an upper grip 23B. The rear grip 23A extends upward from a rear portion of the controller compartment 24. The upper grip 23B extends frontward from the upper end of the rear grip 23A. The rear grip 23A has its lower end connected to the controller compartment 24. The rear grip 23A has its upper end connected to the rear end of the upper grip 23B. The upper grip 23B has its front end connected to an upper portion of the body 21. The grip 23, the body 21, and the controller compartment 24 together define a D-shaped handle. The D-shaped handle is located behind the motor 10. The trigger switch 17 is located in an upper portion of the rear grip 23A.

The controller compartment 24 accommodates the controller 11.

The panel holder 25 holds the interface panel 19.

The battery housing 3 supports the battery holder 9. The battery housing 3 is connected to the main housing 2 in a manner movable relative to the main housing 2. The battery housing 3 is formed from a synthetic resin such as a nylon resin.

The battery housing 3 is located below the controller compartment 24. The battery housing 3 is located behind the protruding portion 22. The battery housing 3 is connected to the D-shaped handle.

The battery housing 3 includes a left battery housing 3L and a right battery housing 3R. The right battery housing 3R is located on the right of the left battery housing 3L. The left battery housing 3L and the right battery housing 3R form a pair of housing halves. The left battery housing 3L and the right battery housing 3R are fastened together with multiple screws 3S. The battery holder 9 is held between the left battery housing 3L and the right battery housing 3R.

The motor case 4 accommodates the motor 10. The motor case 4 is located below the gear case 5. The motor case 4 is fastened to the gear case 5.

The motor case 4 is formed from a synthetic resin such as a polycarbonate resin.

The motor case 4 includes a cylinder 4A and a lower wall 4B. The cylinder 4A surrounds the motor 10. The lower wall 4B is located at the lower end of the cylinder 4A.

The gear case 5 accommodates at least a part of the reducer 13. The gear case 5 is located behind the hammer case 6. The gear case 5 is fastened to the hammer case 6.

The gear case 5 is formed from a metal such as aluminum or magnesium.

The gear case 5 is substantially cylindrical. The gear case 5 has an opening at the front. The gear case 5 has an opening at the rear. The gear case 5 has an opening at the bottom. A bearing cover 40 is received in the opening at the rear of the gear case 5. The bearing cover 40 is fastened to the rear portion of the gear case 5 with a screw 40S.

The hammer case 6 accommodates the striker 15 including a hammer 71. The hammer case 6 is connected to the front of the main housing 2. The hammer case 6 is connected to the front of the gear case 5.

The hammer case 6 is formed from a metal such as aluminum.

The hammer case 6 is substantially cylindrical. The hammer case 6 includes a first cylinder 61, a second cylinder 62, and a front wall 63. The first cylinder 61 surrounds the striker 15 including the hammer 71. The second cylinder 62 is located frontward from the first cylinder 61. The second cylinder 62 has a smaller outer diameter than the first cylinder 61. The gear case 5 has its front end received in an opening at the rear end of the first cylinder 61. The front wall 63 connects the front end of the first cylinder 61 and the rear end of the second cylinder 62.

The main housing 2, the gear case 5, and the hammer case 6 are fastened together with multiple screws 41. The main housing 2 includes multiple screw bosses 2B. The gear case 5 includes multiple screw bosses 5B. The hammer case 6 includes multiple screw bosses 6B. The screws 41 are placed through through-holes in the screw bosses 2B and through-holes in the screw bosses 5B. The screws 41 are placed into threaded holes in the screw bosses 6B. The screws 41 are placed through the through-holes in the screw bosses 2B and the through-holes in the screw bosses 5B from the rear of the screw bosses 2B and then into the threaded holes in the screw bosses 6B.

The motor case 4 has an opening at the top. The gear case 5 has the opening at the bottom. The motor case 4 has an internal space connecting with an internal space of the gear case 5 through the opening at the top of the motor case 4 and the opening at the bottom of the gear case 5. The motor case 4 and the gear case 5 are fastened together with multiple screws (not shown).

The gear case 5 has the opening at the front. The hammer case 6 has an opening at the rear. The internal space of the gear case 5 connects with an internal space of the hammer case 6 through the opening at the front of the gear case 5 and the opening at the rear of the hammer case 6.

The side handle 7 is grippable by the operator. The side handle 7 includes a handle 7A and a base 7B. The handle 7A is grippable by the operator. The base 7B is fastened to the hammer case 6. The handle 7A is located on the left of the hammer case 6. The base 7B includes a first base 7C and a second base 7D. The second base 7D is located below the first base 7C. The first base 7C and the second base 7D are arc-shaped. The first base 7C and the second base 7D hold the first cylinder 61 in the hammer case 6 between them. The first base 7C and the second base 7D have right end portions connected to each other with a hinge 7E. The first base 7C and the second base 7D have left end portions connected to the handle 7A.

The left end portion of the first base 7C and the left end portion of the second base 7D are connected to each other with a fastening assembly 42. The fastening assembly 42 includes a screw 42A and a dial 42B. The screw 42A extends through the left end portion of the second base 7D. The dial 42B is rotatable relative to the screw 42A. The operator rotates the dial 42B to adjust the distance between the left end portion of the first base 7C and the left end portion of the second base 7D. As the screw 42A is rotated to shorten the distance between the left end portion of the first base 7C and the left end portion of the second base 7D, the base 7B tightly holds the hammer case 6, fastening the side handle 7 to the hammer case 6.

Although the handle 7A in the embodiment is located on the left of the hammer case 6, the handle 7A may be located at any position around the hammer case 6. The handle 7A may be located, for example, on the right of, above, or below the hammer case 6. The position (angle) of the handle 7A with respect to the hammer case 6 is adjustable by up to 360 degrees.

The bumper 8 covers at least a part of the surface of the hammer case 6. The bumper 8 in the embodiment covers the surface of the first cylinder 61. The bumper 8 protects the hammer case 6. The bumper 8 reduces contact between the hammer case 6 and objects around the impact tool 1. The bumper 8 is formed from an elastic material that is more flexible than the material for the hammer case 6, such as styrene butadiene rubber.

The battery holder 9 holds a battery pack 43 in a detachable manner. The controller compartment 24 is located above the battery pack 43 attached to the battery holder 9. The protruding portion 22 is located in front of the battery pack 43 attached to the battery holder 9. The battery pack 43 functions as a power supply for the impact tool 1. The battery pack 43 includes a secondary battery. The battery pack 43 in the embodiment includes a rechargeable lithium-ion battery. The battery pack 43 is attached to the battery holder 9 to power the impact tool 1. The motor 10 is driven by power supplied from the battery pack 43. The controller 11 operates with power supplied from the battery pack 43.

The battery holder 9 holds a plate-like terminal unit 44. The terminal unit 44 includes a synthetic resin plate and terminals. The terminals are metal connection terminals on the plate. When the battery holder 9 receives the battery pack 43, the terminals in the terminal unit 44 are connected to battery terminals that are connection terminals in the battery pack 43.

The battery housing 3 holds a spring 45 and a rubber buffer 46. The spring 45 is located in front of the battery holder 9. The rubber buffer 46 is located in front of the battery pack 43 held by the battery holder 9. The spring 45 urges the battery holder 9 backward. The rubber buffer 46 can come in contact with the front of the battery pack 43. When, for example, the impact tool 1 falls, an elastic force from the spring 45 reduces a shock to the terminal unit 44, and the rubber buffer 46 reduces a shock to the battery pack 43.

The motor 10 functions as a power source for the impact tool 1. The motor 10 is an inner-rotor direct current (DC) brushless motor. The motor 10 includes a stator 47, a rotor 48, and a rotor shaft 49. The stator 47 is supported by the motor case 4. The rotor 48 is at least partially located inside the stator 47. The rotor shaft 49 is fixed to the rotor 48. The rotor 48 is rotatable relative to the stator 47 about the motor rotation axis MX.

The stator 47 includes a stator core and multiple coils. The stator core includes multiple teeth. Each coil is wound around the corresponding tooth with an insulator in between. The coils are connected to one another with a busbar unit.

The rotor 48 rotates about the motor rotation axis MX. The rotor 48 includes a rotor core and a rotor magnet. The rotor magnet is fixed to the rotor core.

A sensor board 50 is fixed to the insulator in the stator 47. The sensor board 50 detects the position of the rotor 48 in the rotation direction. The sensor board 50 includes a rotation detector supported on an annular circuit board. The rotation detector detects the position of the rotor magnet in the rotor 48 to detect the position of the rotor 48 in the rotation direction.

The rotor shaft 49 is fixed to the rotor core in the rotor 48. The rotor 48 and the rotor shaft 49 rotate together about the motor rotation axis MX.

The rotor shaft 49 is rotatably supported by rotor bearings 51 and 52. The rotor bearing 51 supports an upper portion of the rotor shaft 49 protruding upward from the upper end face of the rotor 48 in a rotatable manner. The rotor bearing 52 supports a lower portion of the rotor shaft 49 protruding downward from the lower end face of the rotor 48 in a rotatable manner. The rotor bearing 51 is held by the gear case 5. The rotor bearing 52 is held by the motor case 4.

A first bevel gear 53 is fixed to the upper end of the rotor shaft 49. The first bevel gear 53 is connected to at least a part of the reducer 13. The rotor shaft 49 is connected to the reducer 13 with the first bevel gear 53.

The controller 11 outputs control signals for controlling the motor 10. The controller 11 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a field-effect transistor (FET), and a resistor.

The controller 11 is accommodated in the controller compartment 24. The controller 11 is held by a controller case 11A in the controller compartment 24.

The fan 12 generates an airflow for cooling the motor 10 and the controller 11. The fan 12 is located above the stator 47. The fan 12 is fixed to the upper portion of the rotor shaft 49. The fan 12 is located between the rotor bearing 51 and the stator 47. The fan 12 and the rotor shaft 49 rotate together.

The controller compartment 24 has inlets 26. The body 21 has outlets 27 in its upper portion. The motor case 4 has a vent 4C in its rear portion. As the fan 12 rotates, air outside the main housing 2 flows into an internal space of the controller compartment 24 through the inlets 26 to cool the controller 11. As the fan 12 rotates, the air passing through the internal space of the controller compartment 24 flows into the internal space of the motor case 4 through the vent 4C to cool the motor 10. As the fan 12 rotates, at least a part of the air passing through the internal space of the motor case 4 flows out of the motor case 4 through the outlets 27.

The reducer 13 transmits a rotational force of the motor 10 to the striker 15 through the spindle 14. The reducer 13 connects the rotor shaft 49 and the spindle 14 together. The reducer 13 rotates the spindle 14 at a lower rotational speed than the rotor shaft 49.

The reducer 13 includes a second bevel gear 54 and a planetary gear assembly 55. The second bevel gear 54 meshes with the first bevel gear 53. The planetary gear assembly 55 is driven with a rotational force of the motor 10 transmitted through the second bevel gear 54.

The planetary gear assembly 55 includes a sun gear 55S, multiple planetary gears 55P, and an internal gear 55I. The planetary gears 55P surround the sun gear 55S. The internal gear 55I surrounds the planetary gears 55P. The planetary gear assembly 55 is accommodated in the gear case 5.

The second bevel gear 54 surrounds the sun gear 55S. The second bevel gear 54 is fixed to the sun gear 55S. The second bevel gear 54 and the sun gear 55S rotate together. The second bevel gear 54 and the sun gear 55S are rotatable about the output rotation axis AX. The output rotation axis AX is orthogonal to the motor rotation axis MX. The sun gear 55S has a rear end portion supported by a gear bearing 56. The sun gear 55S has a middle portion supported by a gear bearing 57. The gear bearing 56 is held by the bearing cover 40. The gear bearing 57 is held by the gear case 5. As the rotor shaft 49 rotates to rotate the first bevel gear 53, the second bevel gear 54 rotates. This rotates the sun gear 55S.

Each planetary gear 55P meshes with the sun gear 55S. The planetary gears 55P are rotatably supported by the spindle 14 with a pin 55A. The spindle 14 is rotated by the planetary gears 55P. The internal gear 55I includes internal teeth that mesh with the planetary gears 55P. The internal gear 55I is fixed to the gear case 5. The internal gear 55I includes multiple protrusions on its outer circumferential surface. The protrusions on the internal gear 55I are fitted to recesses on the inner circumferential surface of the gear case 5. The internal gear 55I is constantly nonrotatable relative to the gear case 5.

When the rotor shaft 49 and the first bevel gear 53 rotate as driven by the motor 10, the second bevel gear 54 and the sun gear 55S rotate. As the sun gear 55S rotates, the planetary gears 55P revolve about the sun gear 55S. The planetary gears 55P revolve while meshing with the internal teeth on the internal gear 55I. The revolving planetary gears 55P rotate the spindle 14 connected to the planetary gears 55P with the pin 55A at a lower rotational speed than the rotor shaft 49.

The spindle 14 rotates with a rotational force of the motor 10 transmitted by the reducer 13. The spindle 14 transmits the rotational force of the motor 10 transmitted through the reducer 13 to the striker 15. The spindle 14 is rotatable about the output rotation axis AX. The spindle 14 has a rear portion accommodated in the gear case 5. The spindle 14 has a front portion accommodated in the hammer case 6. The spindle 14 is at least partially located in front of the reducer 13. The spindle 14 is located behind the anvil 16.

The spindle 14 includes a flange 14A, a spindle shaft 14B, and a protruding portion 14C. The spindle shaft 14B protrudes frontward from the flange 14A. The protruding portion 14C protrudes rearward from the flange 14A.

The planetary gears 55P are rotatably supported by the flange 14A and the protruding portion 14C with the pin 55A. The spindle 14 is rotatably supported by a spindle bearing 58. The spindle bearing 58 supports the protruding portion 14C in a rotatable manner. The spindle bearing 58 is held by the gear case 5.

The striker 15 strikes the anvil 16 in the rotation direction about the output rotation axis AX. The striker 15 is located in front of the motor 10. The striker 15 is driven by the motor 10. The striker 15 is rotatable about the output rotation axis AX. A rotational force of the motor 10 is transmitted to the striker 15 through the reducer 13 and the spindle 14. The striker 15 strikes the anvil 16 in the rotation direction with a rotational force of the spindle 14 rotated by the motor 10.

The striker 15 is accommodated in the first cylinder 61 in the hammer case 6. The striker 15 includes the hammer 71, balls 72, a first coil spring 73, a second coil spring 74, a third coil spring 75, a first washer 76, and a second washer 77.

The hammer 71 is located in front of the reducer 13. The hammer 71 surrounds the spindle shaft 14B. The hammer 71 is held by the spindle shaft 14B. The hammer 71 is rotated by the motor 10. The balls 72 are located between the spindle shaft 14B and the hammer 71. The hammer 71 includes a cylindrical hammer body 71A and hammer projections 71B. The hammer projections 71B are located at the front of the hammer body 71A. The hammer body 71A has an annular recess 71C on its rear surface. The recess 71C is recessed frontward from the rear surface of the hammer body 71A.

The hammer 71 is rotated by the motor 10. A rotational force of the motor 10 is transmitted to the hammer 71 through the reducer 13 and the spindle 14. The hammer 71 is rotatable together with the spindle 14 with a rotational force of the spindle 14 rotated by the motor 10. The hammer 71 and the spindle 14 rotate about the output rotation axis AX.

The first washer 76 is received in the recess 71C. The first washer 76 is supported by the hammer 71 with multiple balls 78 in between. The balls 78 are located in front of the first washer 76.

The second washer 77 is located behind the first washer 76 inside the recess 71C. The second washer 77 has a smaller outer diameter than the first washer 76. The second washer 77 and the hammer 71 are movable relative to each other in the front-rear direction.

The first coil spring 73 surrounds the spindle shaft 14B. The first coil spring 73 has its rear end supported by the flange 14A. The first coil spring 73 has its front end received in the recess 71C and supported by the first washer 76. The first coil spring 73 constantly generates an elastic force for moving the hammer 71 forward.

The second coil spring 74 surrounds the spindle shaft 14B. The second coil spring 74 is located radially inward from the first coil spring 73. The second coil spring 74 has its rear end supported by the flange 14A. The second coil spring 74 has its front end received in the recess 71C and supported by the second washer 77. The second coil spring 74 generates an elastic force for moving the hammer 71 forward when the hammer 71 moves backward.

The third coil spring 75 surrounds the spindle shaft 14B. The third coil spring 75 is located radially inward from the first coil spring 73. The third coil spring 75 is received in the recess 71C. The third coil spring 75 has its rear end supported by the second washer 77. The third coil spring 75 has its front end supported by the first washer 76. The third coil spring 75 generates an elastic force for moving the second coil spring 74 backward. The rear end of the second coil spring 74 is pressed against the flange 14A under the elastic force from the third coil spring 75. This restricts free movement of the second coil spring 74 relative to the flange 14A.

The balls 72 are formed from a metal such as steel. The balls 72 are located between the spindle shaft 14B and the hammer 71. The spindle 14 has a spindle groove 14D. The spindle groove 14D receives at least parts of the balls 72. The spindle groove 14D is on the outer surface of the spindle shaft 14B. The hammer 71 has a hammer groove 71D. The hammer groove 71D receives at least parts of the balls 72. The hammer groove 71D is on the inner surface of the hammer 71. The balls 72 are located between the spindle groove 14D and the hammer groove 71D. The balls 72 roll along the spindle groove 14D and the hammer groove 71D. The hammer 71 is movable together with the balls 72. The spindle 14 and the hammer 71 are movable relative to each other in a direction parallel to the output rotation axis AX and in the rotation direction about the output rotation axis AX within a movable range defined by the spindle groove 14D and the hammer groove 71D.

The anvil 16 is an output unit of the impact tool 1 that rotates with a rotational force of the motor 10. The anvil 16 is at least partially located in front of the hammer 71. The anvil 16 is struck by the hammer 71 in the striker 15 in the rotation direction.

The anvil 16 has an anvil recess 16A. The anvil recess 16A is located on the rear end of the anvil 16. The anvil recess 16A is recessed frontward from the rear end of the anvil 16. The spindle 14 is located behind the anvil 16. The spindle shaft 14B has a front end received in the anvil recess 16A.

The anvil 16 includes an anvil shaft 16B and anvil projections 16C. The anvil shaft 16B is located in front of the striker 15. The anvil projections 16C protrude radially outward from the rear end of the anvil shaft 16B. The anvil projections 16C are struck by the striker 15 in the rotation direction about the output rotation axis AX.

The anvil shaft 16B has its front end located in front of the hammer case 6 through a front opening of the second cylinder 62. The anvil shaft 16B receives a socket as a tip tool on the front end.

The anvil 16 is rotatably supported by an anvil bearing 79. The anvil bearing 79 surrounds the anvil shaft 16B. The anvil 16 is rotatable about the output rotation axis AX. The anvil bearing 79 is held by the hammer case 6. The anvil bearing 79 is located inside the second cylinder 62 in the hammer case 6. The anvil bearing 79 is held by the second cylinder 62 in the hammer case 6.

The anvil bearing 79 in the embodiment is a slide bearing. The anvil bearing 79 is cylindrical. The anvil bearing 79 in the embodiment is a sleeve. For example, a cylindrical porous metal member manufactured by powder metallurgy may be impregnated with a lubricant oil to form the slide bearing.

The anvil shaft 16B has an outer circumferential surface that is circular in a cross section orthogonal to the output rotation axis AX. The anvil bearing 79 has an inner circumferential surface that is circular in a cross section orthogonal to the output rotation axis AX.

The anvil shaft 16B has a first groove 16D on its outer circumferential surface. The first groove 16D on the outer circumferential surface of the anvil shaft 16B surrounds the output rotation axis AX.

The anvil bearing 79 has a groove 79A on its inner circumferential surface. The groove 79A on the inner circumferential surface of the anvil bearing 79 surrounds the output rotation axis AX.

An O-ring 80 is located between the first groove 16D and the groove 79A. The O-ring 80 reduces the likelihood of the anvil shaft 16B slipping forward from the hammer case 6. The O-ring 80 is in contact with the inner surfaces of the first groove 16D and the groove 79A. The O-ring 80 is slightly compressed by the inner surfaces of the first groove 16D and the groove 79A. The O-ring 80 seals the boundary between the anvil shaft 16B and the anvil bearing 79.

The hammer case 6 has a bearing support surface 6A in contact with the front end of the anvil bearing 79. The bearing support surface 6A is on a front end portion of the second cylinder 62. The bearing support surface 6A faces rearward. The bearing support surface 6A presses the anvil bearing 79 from the front. The bearing support surface 6A reduces the likelihood of the anvil bearing 79 slipping forward from the hammer case 6. The bearing support surface 6A is annular in a plane orthogonal to the output rotation axis AX. The opening in the front end portion of the second cylinder 62 is located radially inward from the bearing support surface 6A.

The anvil shaft 16B has the front end portion located frontward from the second cylinder 62 through the opening at the front end portion of the second cylinder 62. The anvil shaft 16B is at least partially located in the opening at the front end portion of the second cylinder 62. A seal 81 is adjacent to the front end portion of the second cylinder 62. The seal 81 is located inward from the front end portion of the second cylinder 62. The seal 81 seals the boundary between the front end portion of the second cylinder 62 and the anvil shaft 16B. The seal 81 is located frontward from the O-ring 80.

The anvil shaft 16B has a second groove 16E. The second groove 16E is located rearward from the first groove 16D. The anvil shaft 16B has a smaller section modulus at the second groove 16E than at the first groove 16D. More specifically, the anvil shaft 16B has a smaller section modulus at a cross section of the anvil shaft 16B cut along the second groove 16E and orthogonal to the output rotation axis AX than at a cross section of the anvil shaft 16B cut along the first groove 16D and orthogonal to the output rotation axis AX. The anvil shaft 16B has the smallest bending moment at the second groove 16E. In other words, when receiving a high load, the anvil shaft 16B is breakable most easily at the second groove 16E.

The second groove 16E is located on the outer circumferential surface of the anvil shaft 16B. The second groove 16E is located rearward from the first groove 16D. The second groove 16E surrounds the output rotation axis AX.

The second groove 16E is deeper than the first groove 16D. The depth of the second groove 16E refers to the radial dimension of the second groove 16E.

When receiving a high load during a fastening operation, for example, the anvil shaft 16B may be at least partially broken. The anvil shaft 16B in the embodiment has the second groove 16E. The anvil shaft 16B is thus broken at the second groove 16E when receiving a high load.

When the anvil shaft 16B is broken at the second groove 16E, a portion of the anvil shaft 16B frontward from the second groove 16E may move forward relative to the hammer case 6. In this case, at least a part of the inner surface of the first groove 16D and at least a part of the inner surface of the groove 79A are caught on the O-ring 80.

The anvil bearing 79 has its front end in contact with the bearing support surface 6A of the hammer case 6. When the anvil shaft 16B is broken, the anvil bearing 79 does not move forward relative to the hammer case 6. The O-ring 80 is caught on at least a part of the inner surface of the first groove 16D and at least a part of the inner surface of the groove 79A. The O-ring 80 also does not move forward relative to the hammer case 6. The anvil shaft 16B is caught on the O-ring 80 that does not move forward relative to the hammer case 6. This reduces the likelihood of the anvil shaft 16B slipping forward from the hammer case 6 when the anvil shaft 16B is broken at the second groove 16E. More specifically, this reduces the likelihood of the portion of the anvil shaft 16B frontward from the second groove 16E slipping forward from the impact tool 1 when the anvil shaft 16B is broken.

The trigger switch 17 is operable by the operator to drive the motor 10. The motor 10 being driven refers to the rotor 48 being rotated when the coils in the stator 47 are energized. The trigger switch 17 is located in the upper portion of the rear grip 23A. The trigger switch 17 includes a trigger lever 17A and a switch body 17B. The switch body 17B is located in an internal space of the rear grip 23A. The trigger lever 17A protrudes frontward from an upper front portion of the rear grip 23A. The trigger lever 17A is operated by the operator to move backward. This drives the motor 10. The trigger lever 17A is released from being operated to stop the motor 10.

The light assembly 18 emits illumination light. The light assembly 18 illuminates the anvil 16 and an area around the anvil 16 with illumination light. The light assembly 18 illuminates an area ahead of the anvil 16 with illumination light. The light assembly 18 also illuminates the socket attached to the anvil 16 and an area around the socket with illumination light. The light assembly 18 surrounds the second cylinder 62 in the hammer case 6.

The interface panel 19 includes, for example, an operation button for selecting the light emission mode of the light assembly 18. The interface panel 19 includes, for example, a display that indicates the battery power level of the battery pack 43.

The hook assembly 20 is hooked on an object. The hook assembly 20 includes a base 20A and a ring 20B. The base 20A is fastened to an upper portion of the main housing 2. The base 20A in the embodiment has through-holes to receive the screws 41. The screws 41 are placed through the through-holes in the screw bosses 2B through the through-holes in the base 20A. The base 20A is held between the heads of the screws 41 and the screw bosses 2B and is thus fastened to the upper portion of the main housing 2. The ring 20B protrudes upward from the base 20A. At least a part of the object may be placed through the ring 20B. This causes the impact tool 1 to be suspended from the object with the hook assembly 20.

Light Assembly

Figure 13:
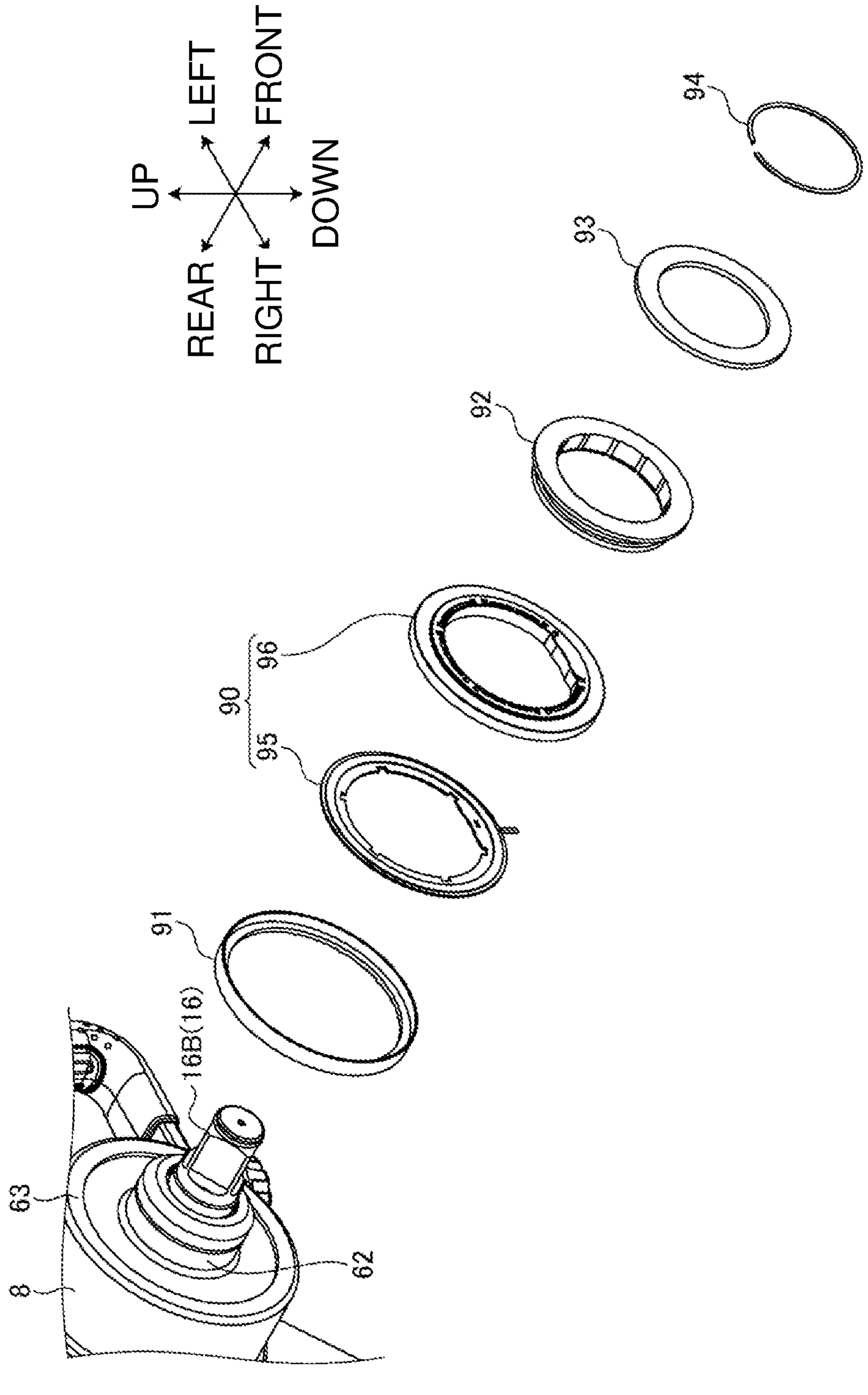
FIG. 13 is an exploded perspective view of a light assembly in the embodiment as viewed from the right front.
Figure 14:
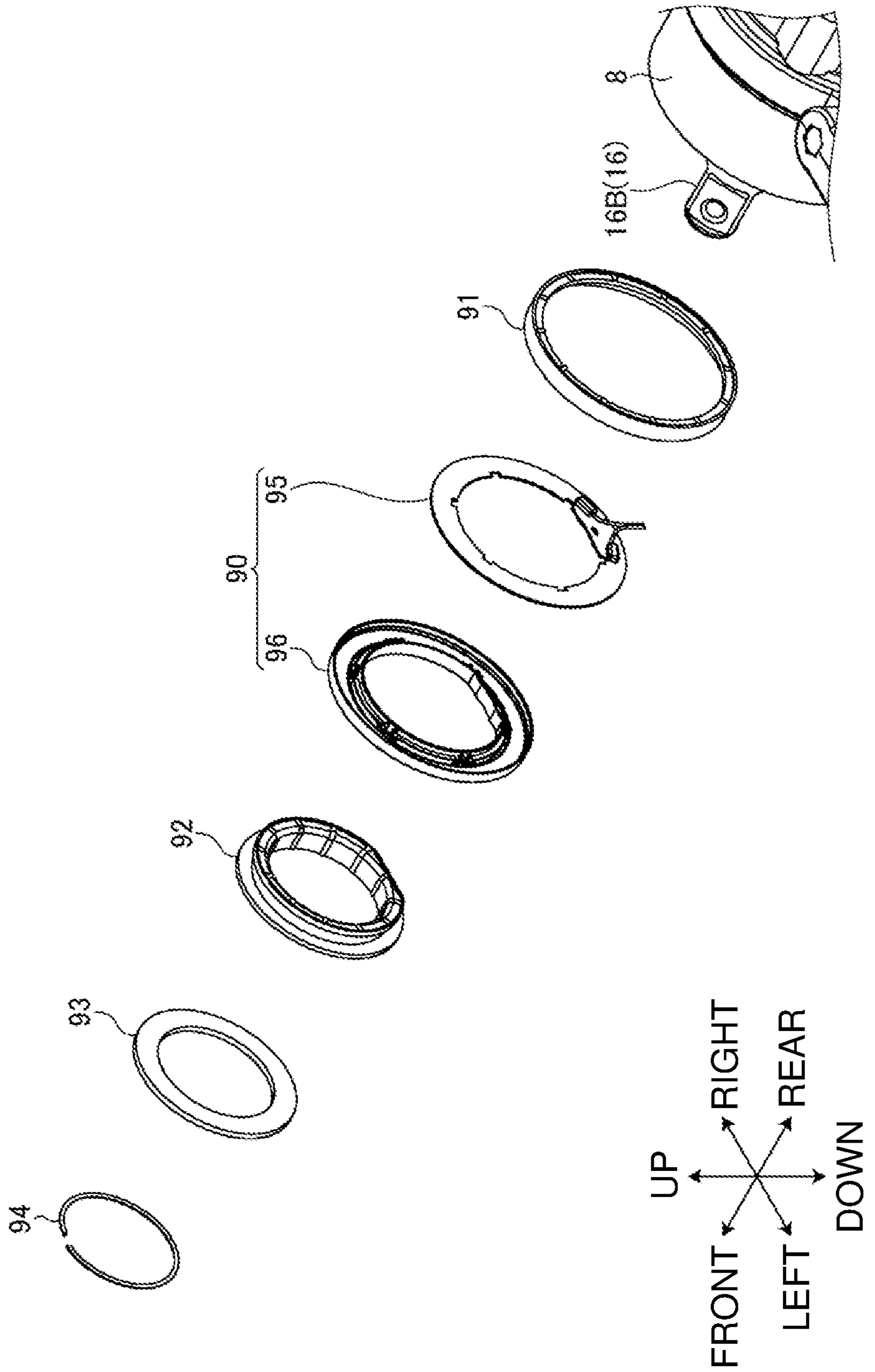
FIG. 14 is an exploded perspective view of the light assembly in the embodiment as viewed from the left rear.
Figure 15:
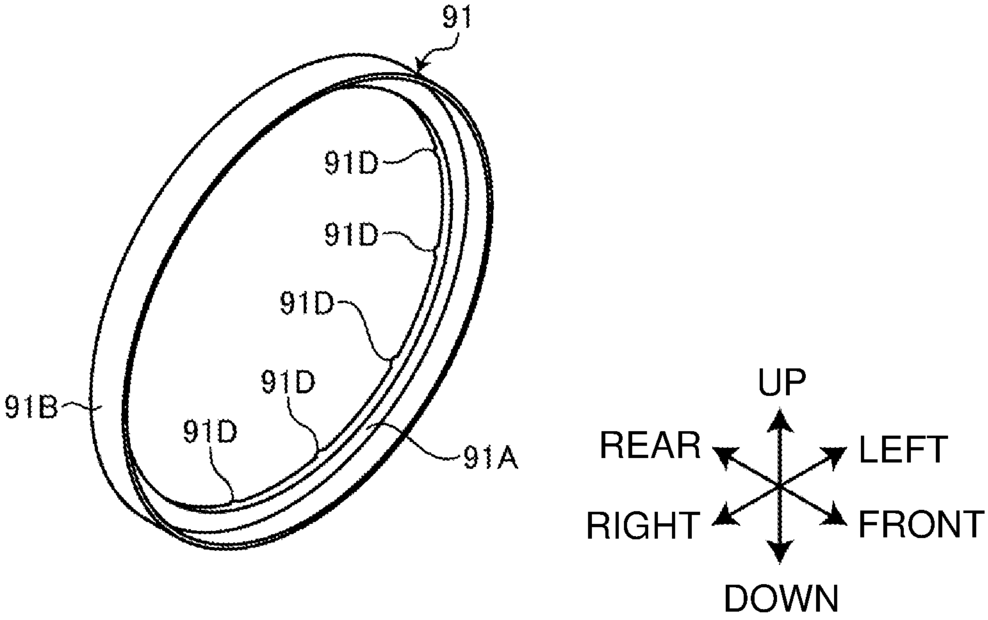
FIG. 15 is a perspective view of an axial elastic member in the embodiment as viewed from the right front.
Figure 16:
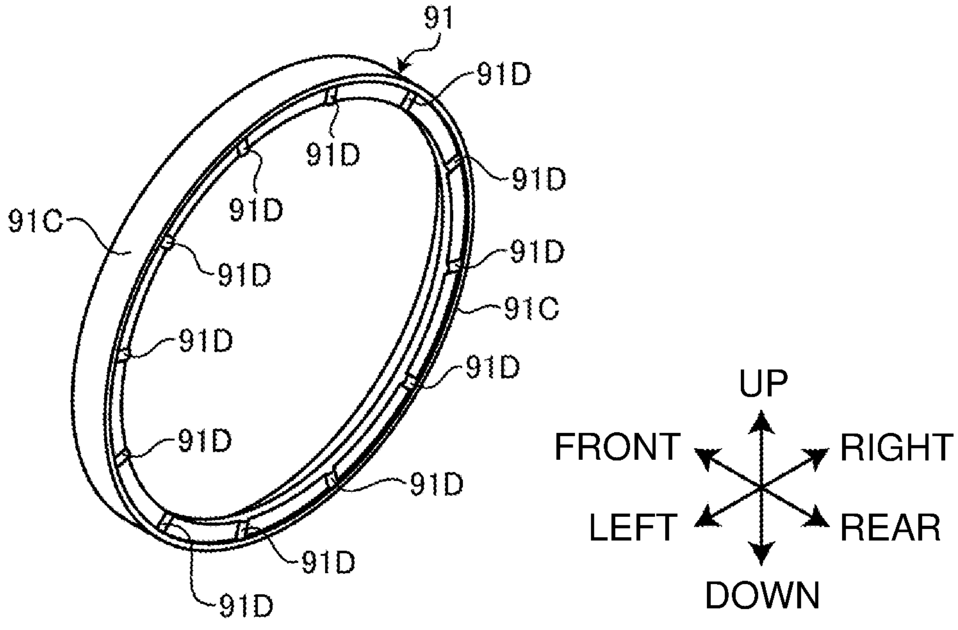
FIG. 16 is a perspective view of the axial elastic member in the embodiment as viewed from the left rear.
Figure 17:
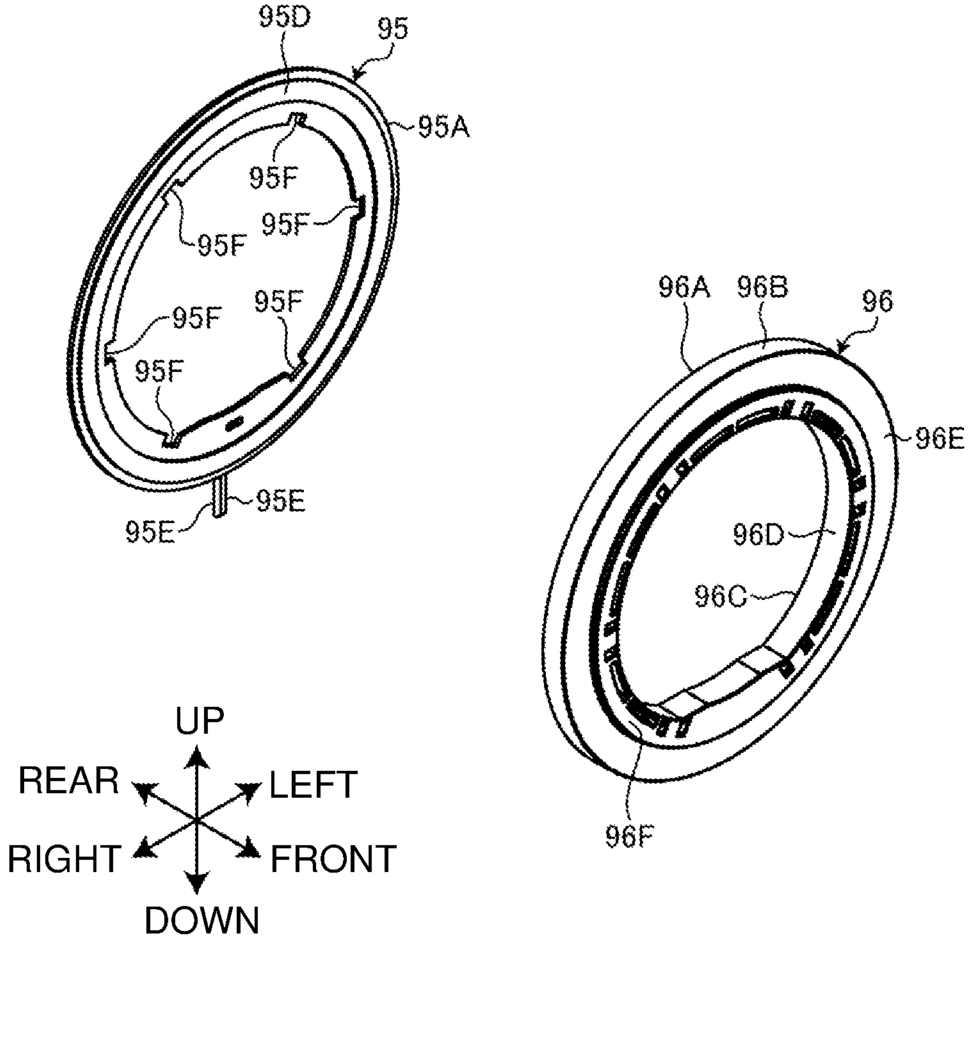
FIG. 17 is a perspective view of a light emitter unit in the embodiment as viewed from the right front.
Figure 18:
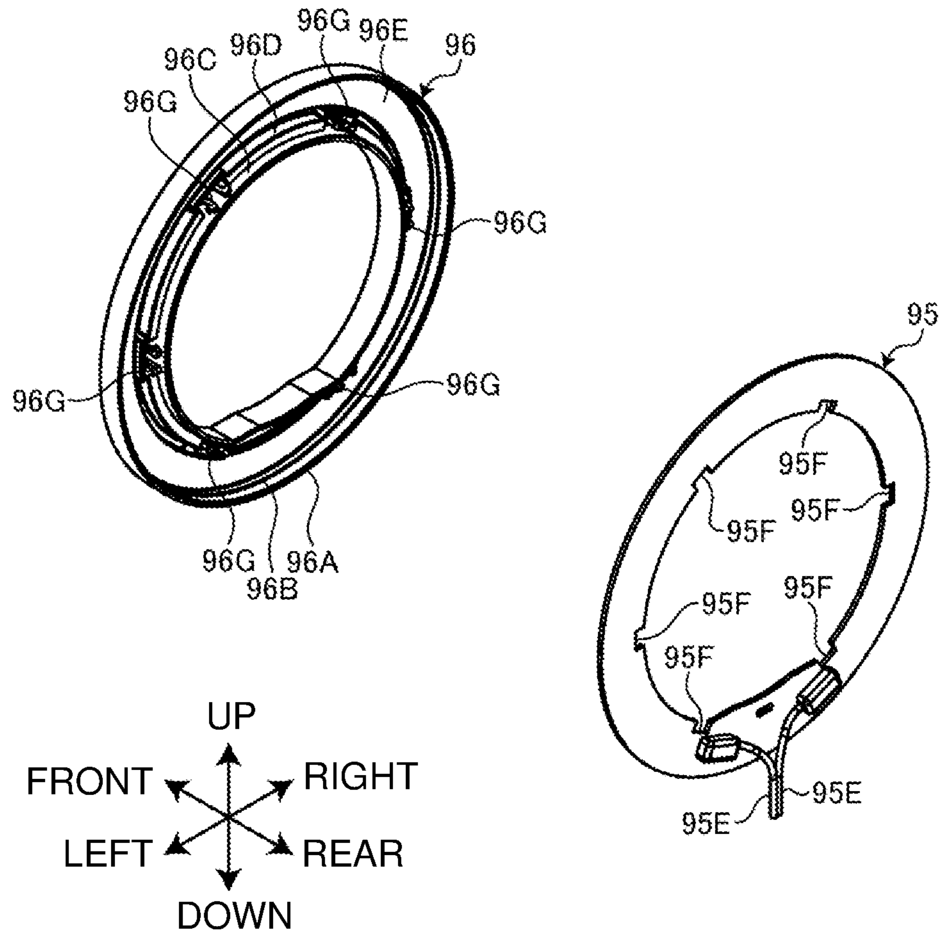
FIG. 18 is a perspective view of the light emitter unit in the embodiment as viewed from the left rear.
Figure 19:
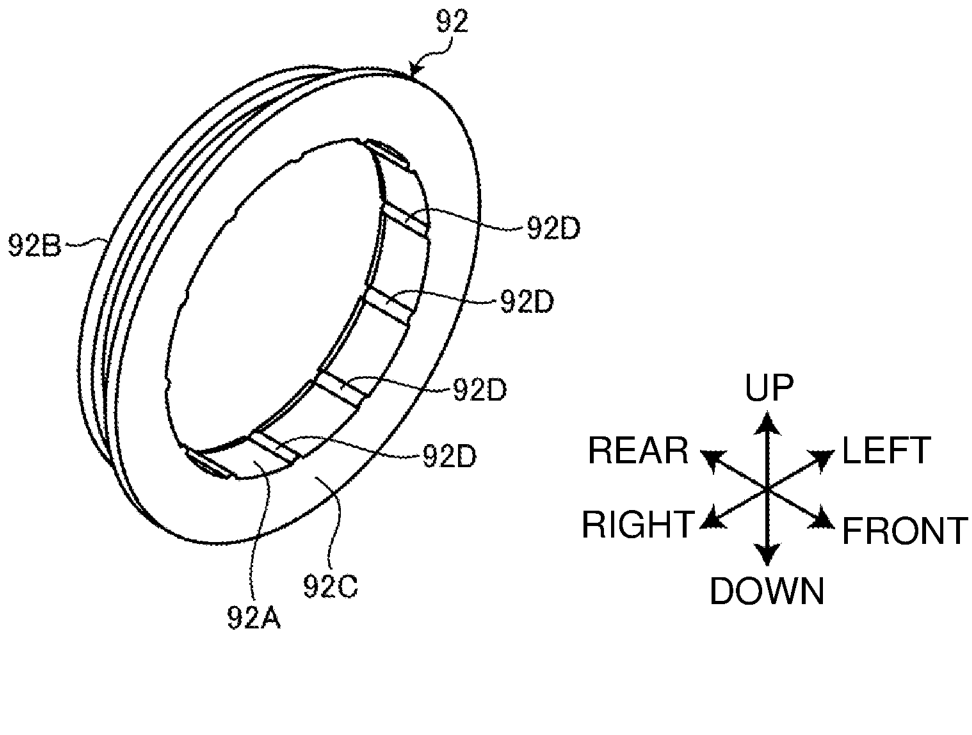
FIG. 19 is a perspective view of a radial elastic member in the embodiment as viewed from the right front.
Figure 20:
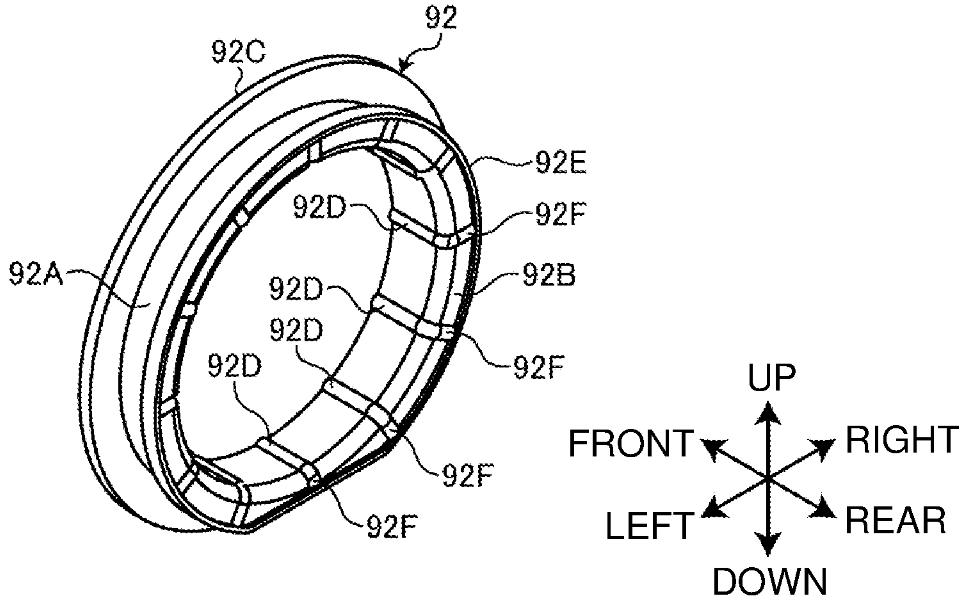
FIG. 20 is a perspective view of the radial elastic member in the embodiment as viewed from the left rear.
Figure 21:
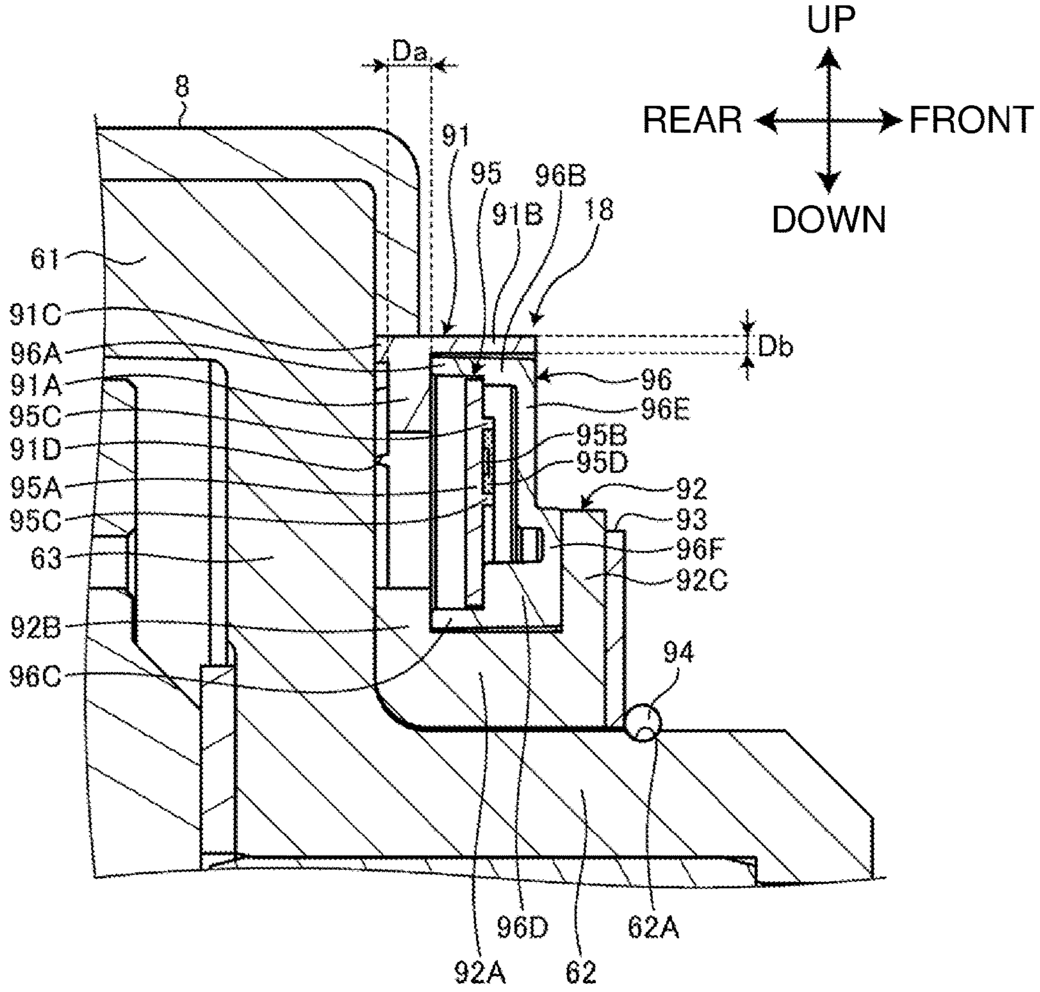
FIG. 21 is a partially enlarged sectional view of the light assembly in the embodiment.

FIG. 13 is an exploded perspective view of the light assembly 18 in the embodiment as viewed from the right front. FIG. 14 is an exploded perspective view of the light assembly 18 as viewed from the left rear. FIG. 15 is a perspective view of an axial elastic member as viewed from the right front. FIG. 16 is a perspective view of the axial elastic member as viewed from the left rear. FIG. 17 is a perspective view of a light emitter unit as viewed from the right front. FIG. 18 is a perspective view of the light emitter unit as viewed from the left rear. FIG. 19 is a perspective view of a radial elastic member as viewed from the right front. FIG. 20 is a perspective view of the radial elastic member as viewed from the left rear. FIG. 21 is a partially enlarged sectional view of the light assembly 18.

The light assembly 18 includes a light emitter unit 90, an axial elastic member 91, a radial elastic member 92, a washer 93, and a ring spring 94.

The light emitter unit 90 includes a chip-on-board (COB) light-emitting diode (LED) 95 and an optical member 96.

The COB LED 95 includes a substrate 95A, LED chips 95B being light emitters, banks 95C, and a phosphor 95D.

The light emitter unit 90 including the LED chips 95B illuminates an area around a front end portion of the anvil 16. The light emitter unit 90 at least partially surrounds the second cylinder 62.

The substrate 95A is annular. The substrate 95A surrounds the anvil shaft 16B with the second cylinder 62 in between. The substrate 95A surrounds the anvil shaft 16B. The substrate 95A is, for example, an aluminum substrate, a glass fabric base epoxy resin substrate (flame retardant 4 or FR-4 substrate), or a composite base epoxy resin substrate (composite epoxy material 3 or CEM-3 substrate). The substrate 95A in the embodiment has multiple recesses 95F on its inner edge. Each recess 95F is recessed radially outward from the inner edge of the substrate 95A. The multiple (six in the present embodiment) recesses 95F are arranged at intervals in the circumferential direction of the substrate 95A.

The LED chips 95B are mounted on the front surface of the substrate 95A. The LED chips 95B at least partially surround the anvil shaft 16B with the second cylinder 62 in between. The LED chips 95B are multiple (36 in the present embodiment) LED chips 95B arranged at intervals in the circumferential direction of the substrate 95A. The LED chips 95B may be 60 or 72 LED chips 95B arranged at equal intervals in the circumferential direction of the substrate 95A. The LED chips 95B are connected to the substrate 95A with gold wires (not shown). The gold wires interconnect the multiple LED chips 95B.

The banks 95C are located on the front surface of the substrate 95A. The banks 95C protrude frontward from the front surface of the substrate 95A. The banks 95C define a space for the phosphor 95D. The banks 95C surround the LED chips 95B. One bank 95C is located radially inward from the LED chips 95B, and the other bank 95C is located radially outward from the LED chips 95B. The banks 95C are annular. The banks 95C in the embodiment have a double annular structure. More specifically, the banks 95C in the embodiment include a first annular bank 95C and a second annular bank 95C. The first bank 95C is located on the front surface of the substrate 95A. The second bank 95C is located radially outward from the first bank 95C on the front surface of the substrate 95A. The first bank 95C is located radially inward from the LED chips 95B. The second bank 95C is located radially outward from the LED chips 95B. The LED chips 95B are between the first bank 95C and the second bank 95C.

The phosphor 95D is located on the front surface of the substrate 95A. The phosphor 95D covers the LED chips 95B between the banks 95C. The phosphor 95D is annular. The phosphor 95D covers the LED chips 95B between the first bank 95C and the second bank 95C.

A pair of electrodes are located outside the banks 95C on the rear surface of the substrate 95A. The pair of electrodes include a positive electrode and a negative electrode. A pair of lead wires 95E are connected to the substrate 95A. The lead wires 95E are connected to the electrodes. The pair of lead wires 95E are supported on the rear surface of the substrate 95A. The electrodes may be located on the front surface of the substrate 95A. The lead wires 95E may be supported on the front surface of the substrate 95A.

A current output from the battery pack 43 is supplied to the electrodes through the controller 11 and the lead wires 95E. The voltage of the battery pack 43 is decreased by the controller 11 and applied to the electrodes. The current supplied to the electrodes is supplied to the LED chips 95B through the substrate 95A and the gold wires. The LED chips 95B emit light with the current supplied from the battery pack 43.

The optical member 96 faces the front surfaces of the LED chips 95B. The optical member 96 transmits light emitted from the LED chips 95B. The optical member 96 is connected to the COB LED 95. The optical member 96 is fixed to the substrate 95A.

The optical member 96 is formed from a polycarbonate resin. The optical member 96 in the embodiment is formed from a polycarbonate resin containing a white diffusion material. The optical member 96 is milky white. The optical member 96 has a light transmittance of 40 to 70% inclusive. The milky white optical member 96 causes the profile of each LED chip 95B to be less visible from outside the impact tool 1. The impact tool 1 thus has an improved design.

The optical member 96 is at least partially located frontward from the COB LED 95. The optical member 96 includes a first outer cylinder 96A, a second outer cylinder 96B, a first inner cylinder 96C, a second inner cylinder 96D, a light transmitter 96E, a protrusion 96F, and snap-fits 96G.

The first outer cylinder 96A and the second outer cylinder 96B are located radially outward from the first inner cylinder 96C and the second inner cylinder 96D. The first outer cylinder 96A and the second outer cylinder 96B are located adjacent to the outer circumference of the COB LED 95. The first inner cylinder 96C and the second inner cylinder 96D are located adjacent to the inner circumference of the COB LED 95. The COB LED 95 is located between the first outer cylinder 96A as well as the second outer cylinder 96B and the first inner cylinder 96C as well as the second inner cylinder 96D in the radial direction.

The first outer cylinder 96A is located radially outward from the substrate 95A. The second outer cylinder 96B is located frontward from the first outer cylinder 96A. The second outer cylinder 96B has a smaller inner diameter than the first outer cylinder 96A. A step is defined at the boundary between the front end of the first outer cylinder 96A and the rear end of the second outer cylinder 96B. The substrate 95A has the front surface with its outer edge supported by the step defined at the boundary between the front end of the first outer cylinder 96A and the rear end of the second outer cylinder 96B.

The first inner cylinder 96C is located radially inward from the substrate 95A. The second inner cylinder 96D is located frontward from the first inner cylinder 96C. The second inner cylinder 96D has a smaller inner diameter than the first inner cylinder 96C. A step is defined at the boundary between the front end of the first inner cylinder 96C and the rear end of the second inner cylinder 96D. The substrate 95A has the front surface with its inner edge supported by the step defined at the boundary between the front end of the first inner cylinder 96C and the rear end of the second inner cylinder 96D.

The light transmitter 96E is located frontward from the COB LED 95. The light transmitter 96E is annular. The light transmitter 96E is located frontward from the LED chips 95B. The light transmitter 96E connects the front end of the second outer cylinder 96B and the front end of the second inner cylinder 96D. The light transmitter 96E faces the front surface of the substrate 95A. The light transmitter 96E faces the LED chips 95B. The light transmitter 96E allows light emitted from the LED chips 95B to pass through to illuminate an area ahead of the light emitter unit 90.

The light transmitter 96E has an incident surface and an emission surface. Light from the LED chips 95B enters the incident surface. The light through the light transmitter 96E is emitted through the emission surface. The front surface of the substrate 95A faces the incident surface of the light transmitter 96E. The incident surface faces the LED chips 95B. The incident surface faces substantially rearward. The emission surface faces substantially frontward.

The protrusion 96F is located inward from the light transmitter 96E. The protrusion 96F protrudes frontward from the second inner cylinder 96D. The protrusion 96F is located frontward from the emission surface of the light transmitter 96E. The protrusion 96F is annular.

The substrate 95A has the rear surface located frontward from the rear ends of the first outer cylinder 96A and the first inner cylinder 96C. The optical member 96 and the substrate 95A in the COB LED 95 are fastened together with fasteners. The fasteners include the snap-fits 96G in the optical member 96. Each snap-fit 96G is located circumferentially inward from the incident surface of the light transmitter 96E and protrudes rearward. The snap-fits 96G are multiple (six in the present embodiment) snap fits 96G arranged at intervals in the circumferential direction of the optical member 96. The snap-fits 96G are received in the respective six recesses 95F. The optical member 96 and the substrate 95A in the COB LED 95 are thus fastened together.

The axial elastic member 91 and the radial elastic member 92 are formed from rubber. The axial elastic member 91 and the radial elastic member 92 reduce transmission of vibrations from the hammer case 6 to the light emitter unit 90. The axial elastic member 91 and the radial elastic member 92 each function as a vibration isolator to reduce vibrations received by the light emitter unit 90.

The radial elastic member 92 is annular. The radial elastic member 92 surrounds the anvil shaft 16B. The radial elastic member 92 surrounds the second cylinder 62.

The radial elastic member 92 is supported by the hammer case 6. The radial elastic member 92 supports the light emitter unit 90 from radially inside the light emitter unit 90. The radial elastic member 92 includes a radial base 92A. The radial base 92A is located between the second cylinder 62 and the light emitter unit 90 in the radial direction. The radial base 92A is cylindrical. The radial base 92A surrounds the second cylinder 62.

The radial base 92A has an inner circumferential surface and radial ribs 92D. The inner circumferential surface faces the outer circumferential surface of the second cylinder 62. Each radial rib 92D protrudes radially inward from the inner circumferential surface of the radial base 92A. The radial ribs 92D are multiple radial ribs 92D arranged circumferentially at intervals. The radial ribs 92D are in contact with the outer circumferential surface of the second cylinder 62. The inner circumferential surface of the radial base 92A is apart from the outer circumferential surface of the second cylinder 62. The outer circumferential surface of the radial base 92A is in contact with the inner circumferential surface of the light emitter unit 90. The inner circumferential surface of the light emitter unit 90 in the embodiment is the inner circumferential surface of the optical member 96.

The radial elastic member 92 includes a rear support 92B and a front support 92C. The rear support 92B supports the light emitter unit 90 from the rear. The front support 92C supports the light emitter unit 90 from the front. The rear support 92B is connected to the rear end of the radial base 92A. The rear support 92B protrudes radially outward from the rear end of the radial base 92A. The front support 92C is connected to the front end of the radial base 92A. The front support 92C protrudes radially outward from the front end of the radial base 92A. The rear support 92B and the front support 92C are annular. The radial base 92A, the rear support 92B, and the front support 92C are integral with one another.

The rear support 92B includes a rear surface, an annular protrusion 92E, and first axial ribs 92F. The rear surface faces the front surface of the front wall 63. The annular protrusion 92E protrudes rearward from the rear surface of the rear support 92B. Each first axial rib 92F protrudes rearward from the rear surface of the rear support 92B. The annular protrusion 92E is located on the outer edge of the rear surface of the rear support 92B. The first axial ribs 92F are located radially inward from the annular protrusion 92E. The first axial ribs 92F are multiple first axial ribs 92F arranged circumferentially at intervals. The annular protrusion 92E and the first axial ribs 92F are in contact with the front surface of the front wall 63. The rear surface of the rear support 92B is apart from the front surface of the front wall 63. The front surface of the rear support 92B is in contact with the rear surface of the light emitter unit 90. The front surface of the rear support 92B in the embodiment is in contact with the rear surface of the first inner cylinder 96C in the optical member 96.

The rear surface of the front support 92C is in contact with the front surface of the light emitter unit 90. The rear surface of the front support 92C in the embodiment is in contact with the front surface of the protrusion 96F.

The washer 93 supports the front support 92C from the front. The washer 93 has a rear surface in contact with the front surface of the front support 92C. The ring spring 94 supports the washer 93 from the front. The ring spring 94 is received in a groove 62A on the outer circumferential surface of the second cylinder 62. The ring spring 94 is thus fixed to the second cylinder 62 in the hammer case 6. The ring spring 94 presses the washer 93 against the front support 92C. The washer 93 and the ring spring 94 are fixed to at least a part of the hammer case 6 and function as fasteners for supporting the front support 92C from the front.

The front support 92C is pushed backward by the ring spring 94 with the washer 93 in between. The light emitter unit 90 and the rear support 92B are thus also pushed backward. The light emitter unit 90 and the radial elastic member 92 are held between the front wall 63 and the washer 93 in the front-rear direction. This fixes the light emitter unit 90 and the radial elastic member 92 to the hammer case 6.

The axial elastic member 91 supports the light emitter unit 90 from the rear. The axial elastic member 91 is located radially outward from the radial elastic member 92. The axial elastic member 91 includes an axial base 91A. The axial base 91A is located between the front wall 63 and the light emitter unit 90 in the axial direction. The axial base 91A is annular.

The axial base 91A includes a rear surface, an annular protrusion 91C, and second axial ribs 91D. The rear surface faces the front surface of the front wall 63. The annular protrusion 91C protrudes rearward from the rear surface of the axial base 91A. Each second axial rib 91D protrudes rearward from the rear surface of the axial base 91A. The annular protrusion 91C is located on the outer edge of the rear surface of the axial base 91A. The second axial ribs 91D are located radially inward from the annular protrusion 91C. The second axial ribs 91D are multiple second axial ribs 91D arranged circumferentially at intervals. The annular protrusion 91C and the second axial ribs 91D are in contact with the front surface of the front wall 63. The rear surface of the axial base 91A is apart from the front surface of the front wall 63. The front surface of the axial base 91A is in contact with the rear surface of the light emitter unit 90. The front surface of the axial base 91A in the embodiment is in contact with the rear surface of the first outer cylinder 96A in the optical member 96.

The axial base 91A is held between the front surface of the front wall 63 and the rear surface of the first outer cylinder 96A in the optical member 96 in the front-rear direction. The axial base 91A supports the light emitter unit 90 from the rear. The axial elastic member 91 is supported by the hammer case 6.

The axial elastic member 91 includes a cover 91B. The cover 91B covers the light emitter unit 90 from radially outside the light emitter unit 90. The cover 91B is cylindrical. The cover 91B is in contact with the outer circumferential surface of the light emitter unit 90. The outer circumferential surface of the light emitter unit 90 includes the outer circumferential surface of the optical member 96. The cover 91B covers the outer circumferential surface of the optical member 96. The cover 91B presses, with its elastic force, the light emitter unit 90 from radially outside the light emitter unit 90. The axial elastic member 91 is thus fixed to the light emitter unit 90.

As shown in FIG. 21, the cover 91B has a radial dimension db smaller than an axial dimension Da of the axial base 91A.

As described above, the axial elastic member 91 and the radial elastic member 92 supported by the hammer case 6 support the light emitter unit 90 from radially inside, radially outside, the rear, and the front. The axial elastic member 91 and the radial elastic member 92 surround the light emitter unit 90. The light emitter unit 90 and the hammer case 6 are not in contact with each other with the axial elastic member 91 and the radial elastic member 92 in between.

As shown in FIG. 9, the axial elastic member 91, the radial elastic member 92, and the light emitter unit 90 are located radially inward from a line VL connecting the front end of the first cylinder 61 and the front end of the anvil 16 in a cross section including and parallel to the output rotation axis AX.

Shock Absorber

Figure 22:
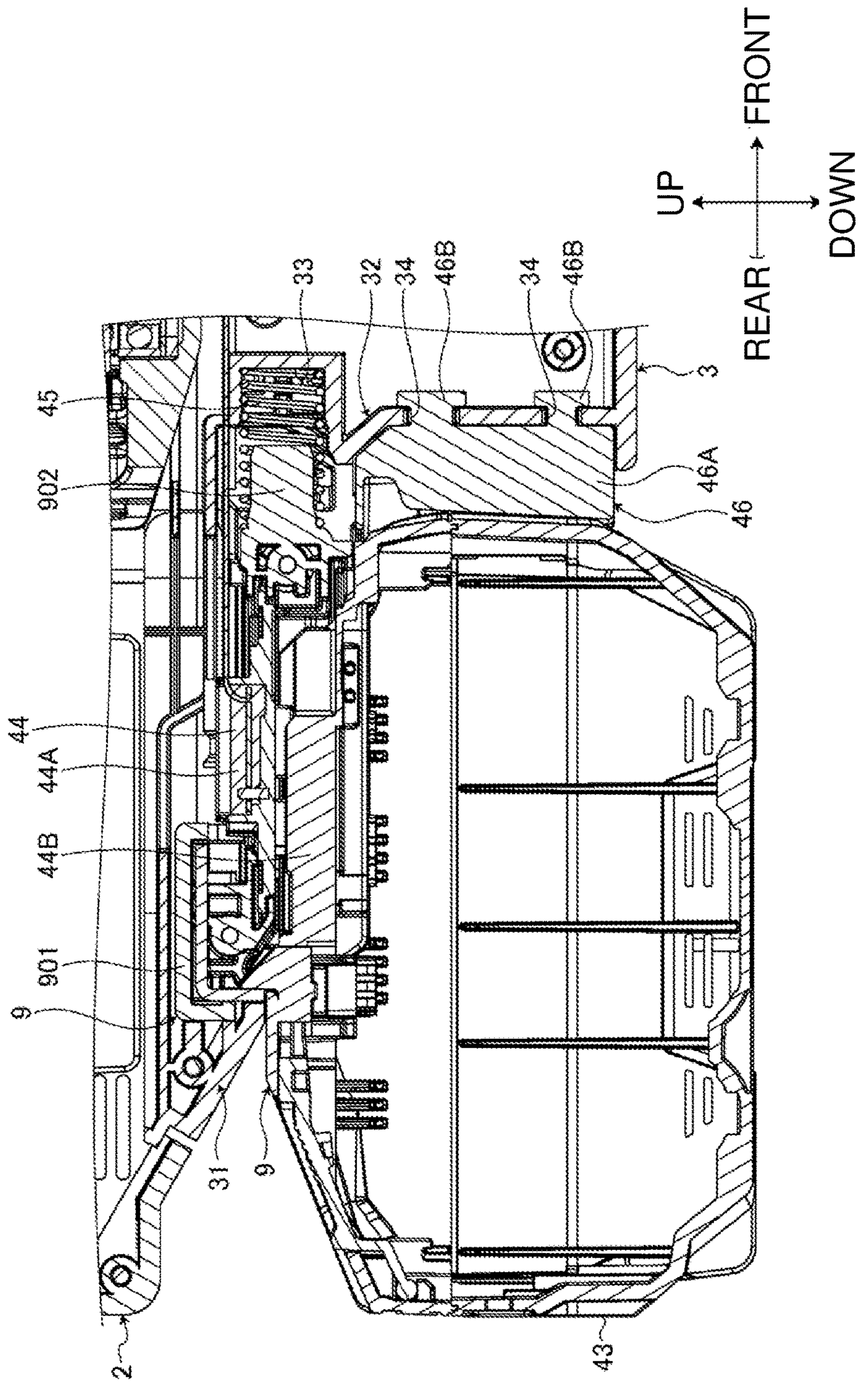
FIG. 22 is a partial sectional view of the impact tool according to the embodiment.
Figure 23:
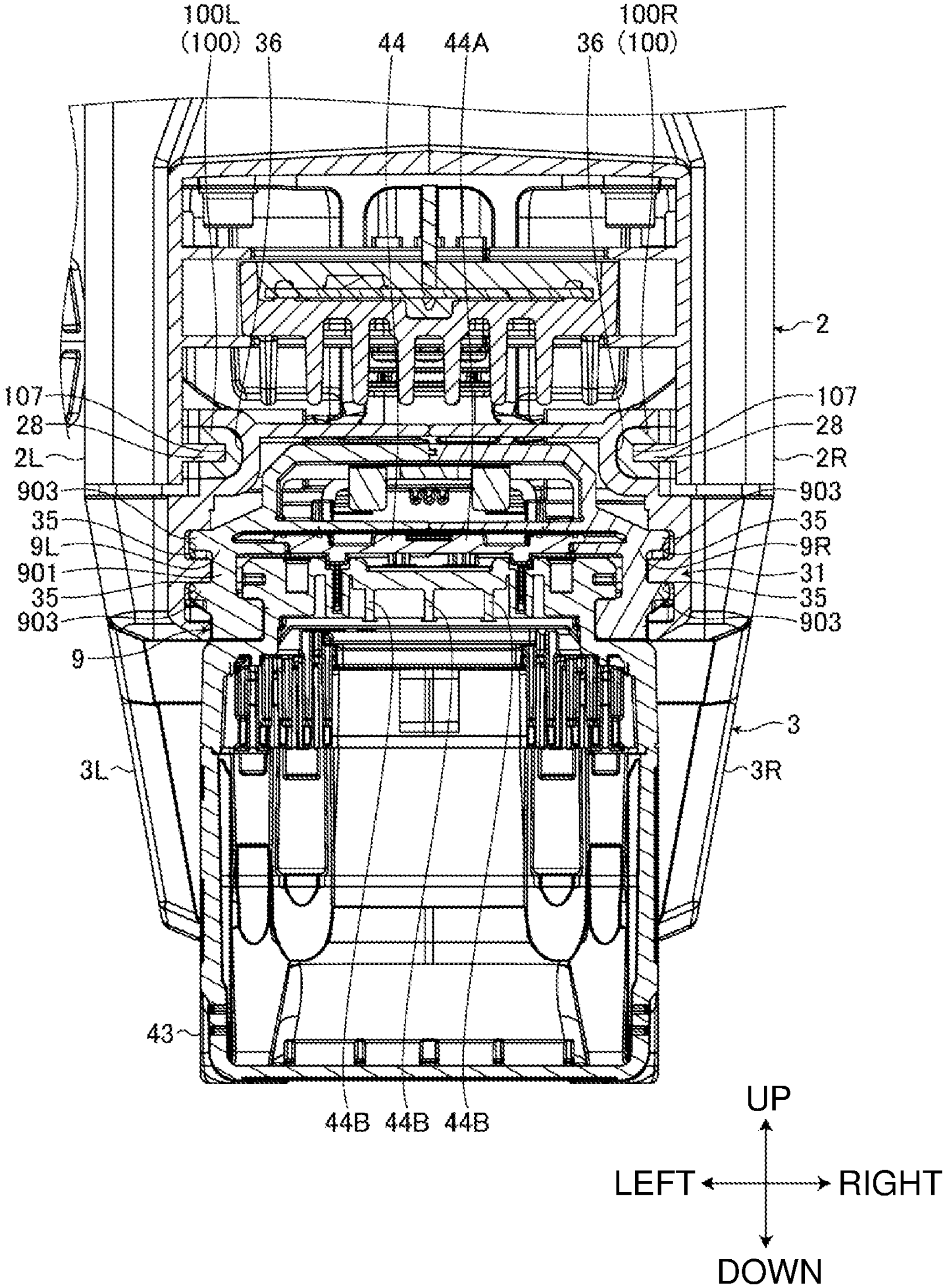
FIG. 23 is a partial sectional view of the impact tool according to the embodiment.
Figure 24:
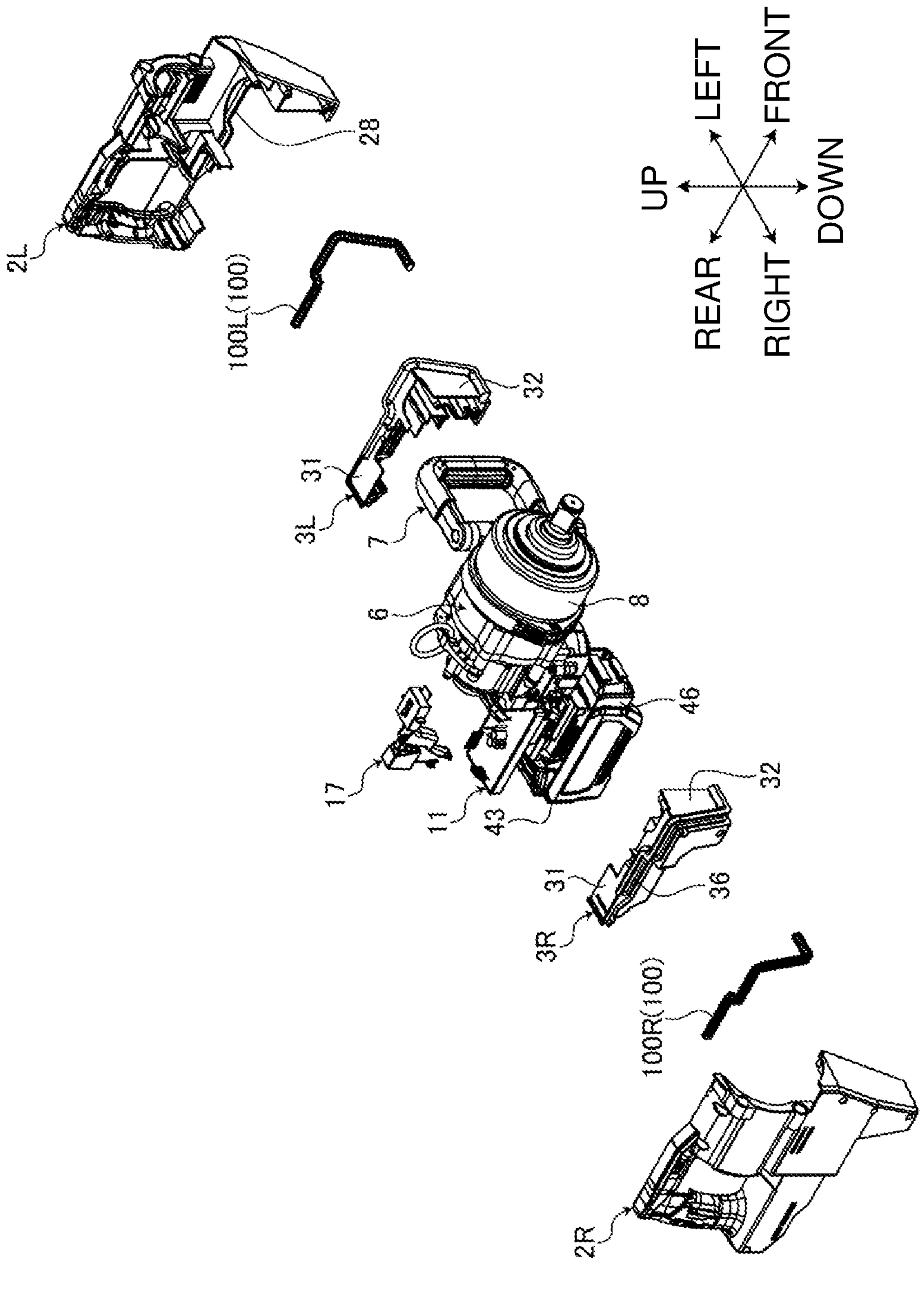
FIG. 24 is an exploded perspective view of the impact tool according to the embodiment as viewed from the right front.
Figure 25:
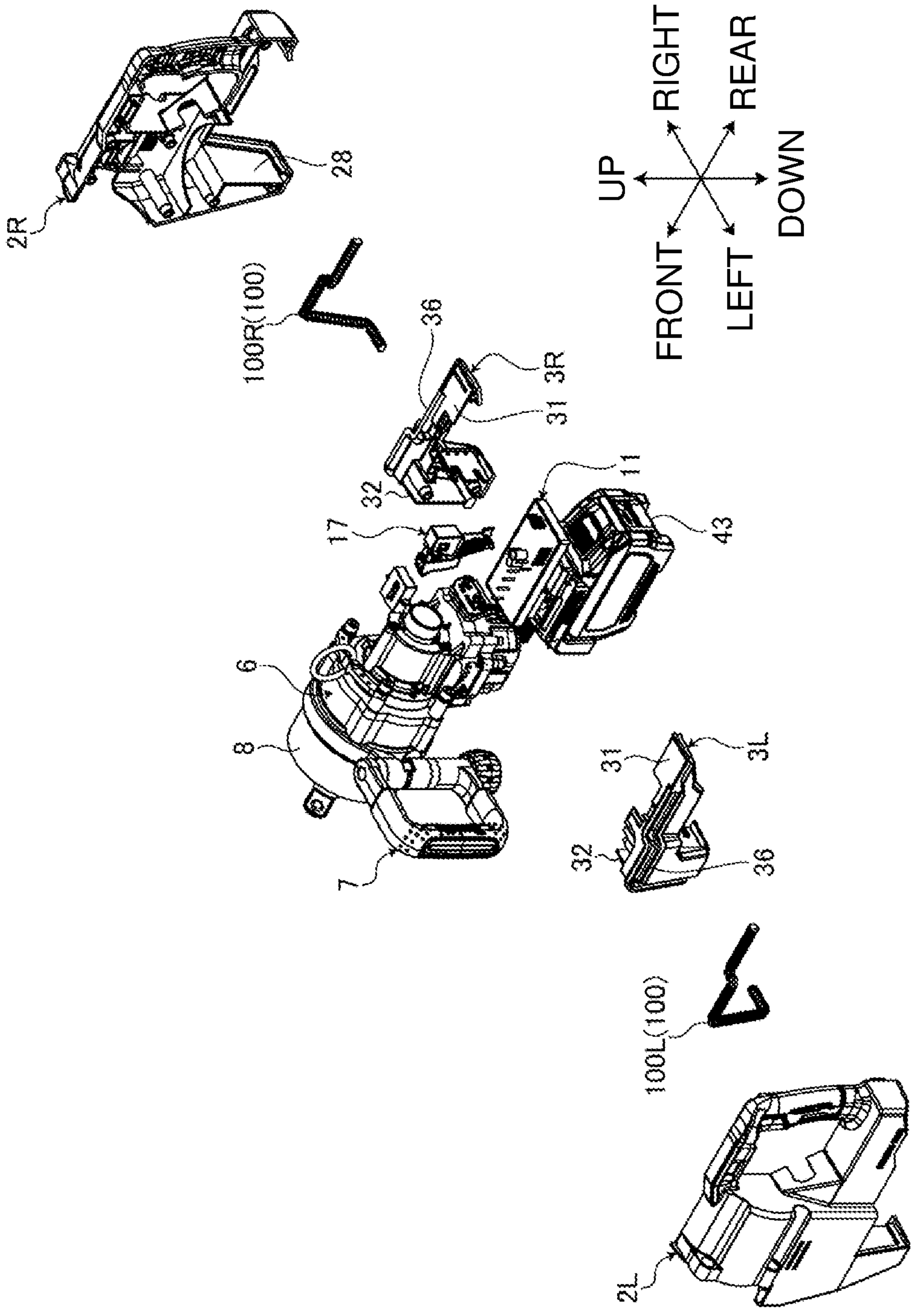
FIG. 25 is an exploded perspective view of the impact tool according to the embodiment as viewed from the left rear.
Figure 26:
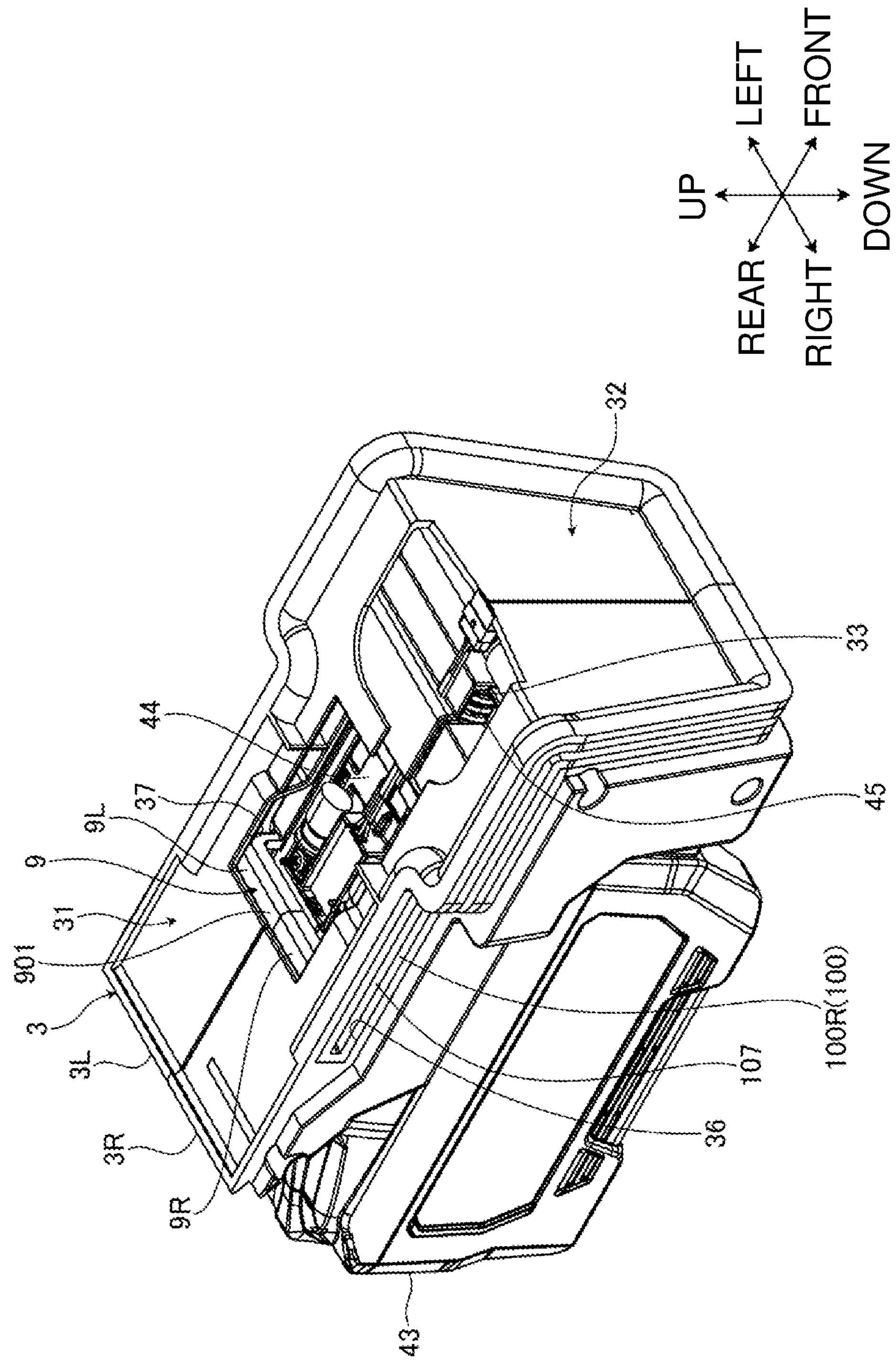
FIG. 26 is a perspective view of a battery housing in the embodiment as viewed from the right front.
Figure 27:
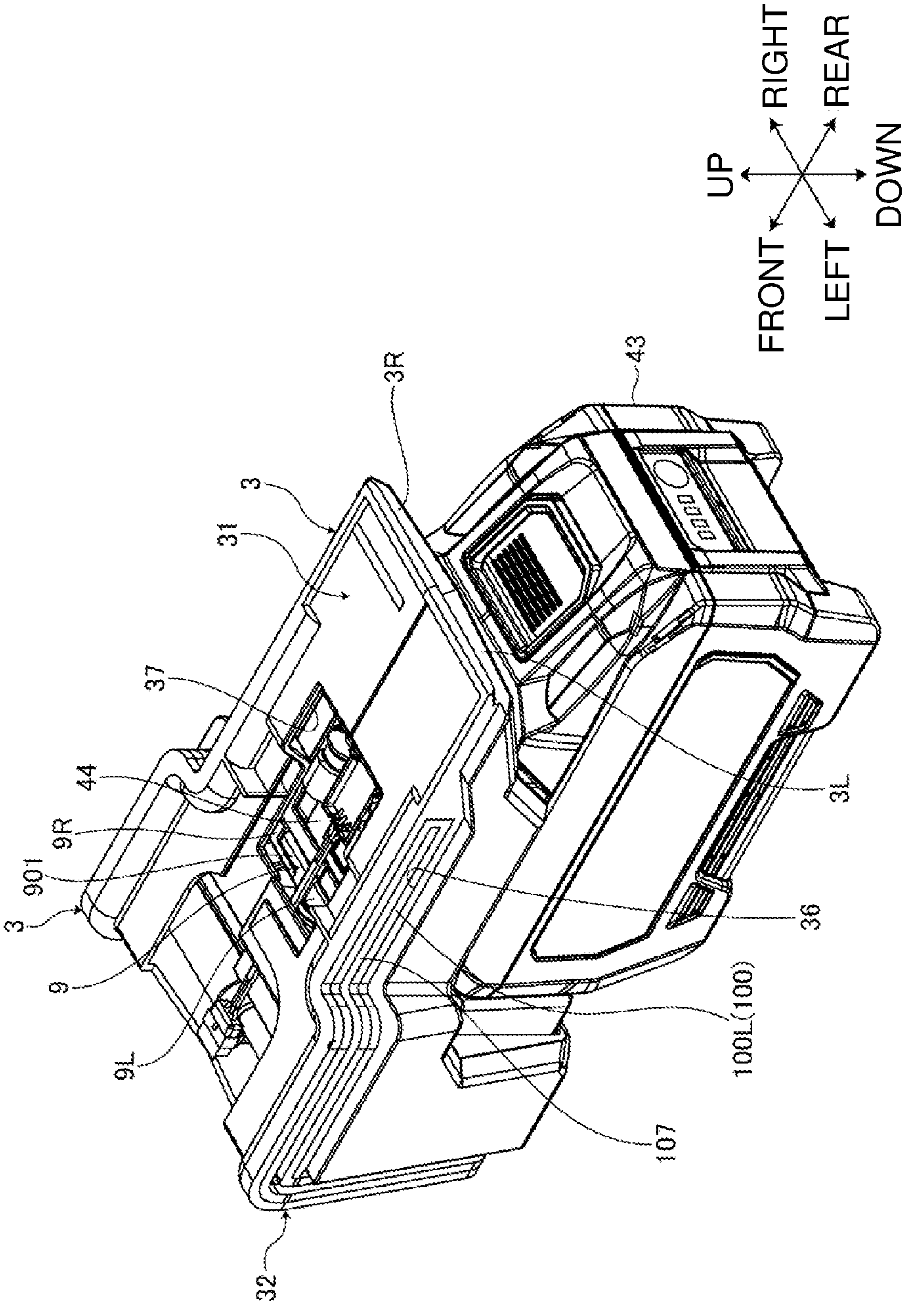
FIG. 27 is a perspective view of the battery housing in the embodiment as viewed from the left rear.
Figure 28:
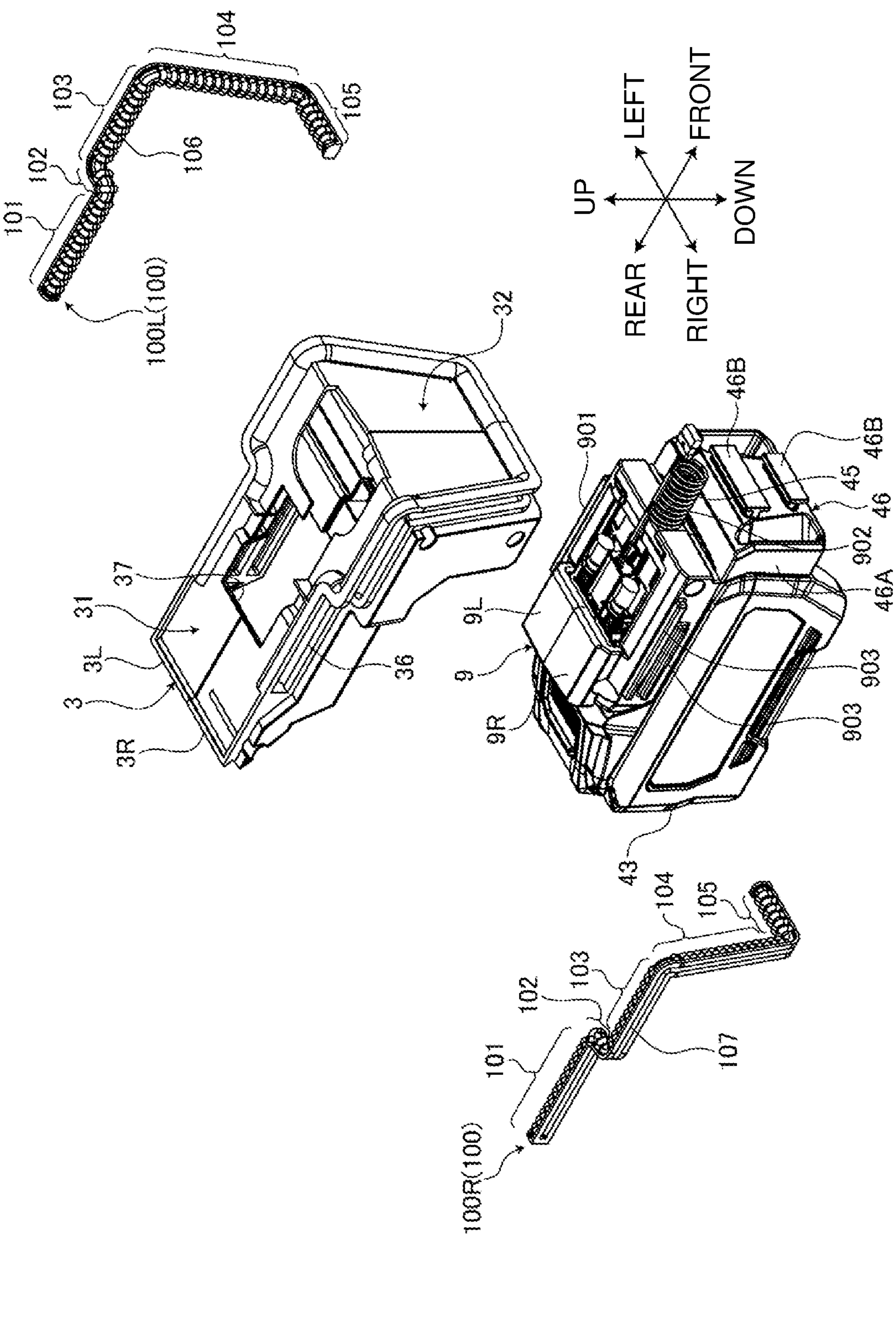
FIG. 28 is an exploded perspective view of the battery housing in the embodiment as viewed from the right front.
Figure 29:
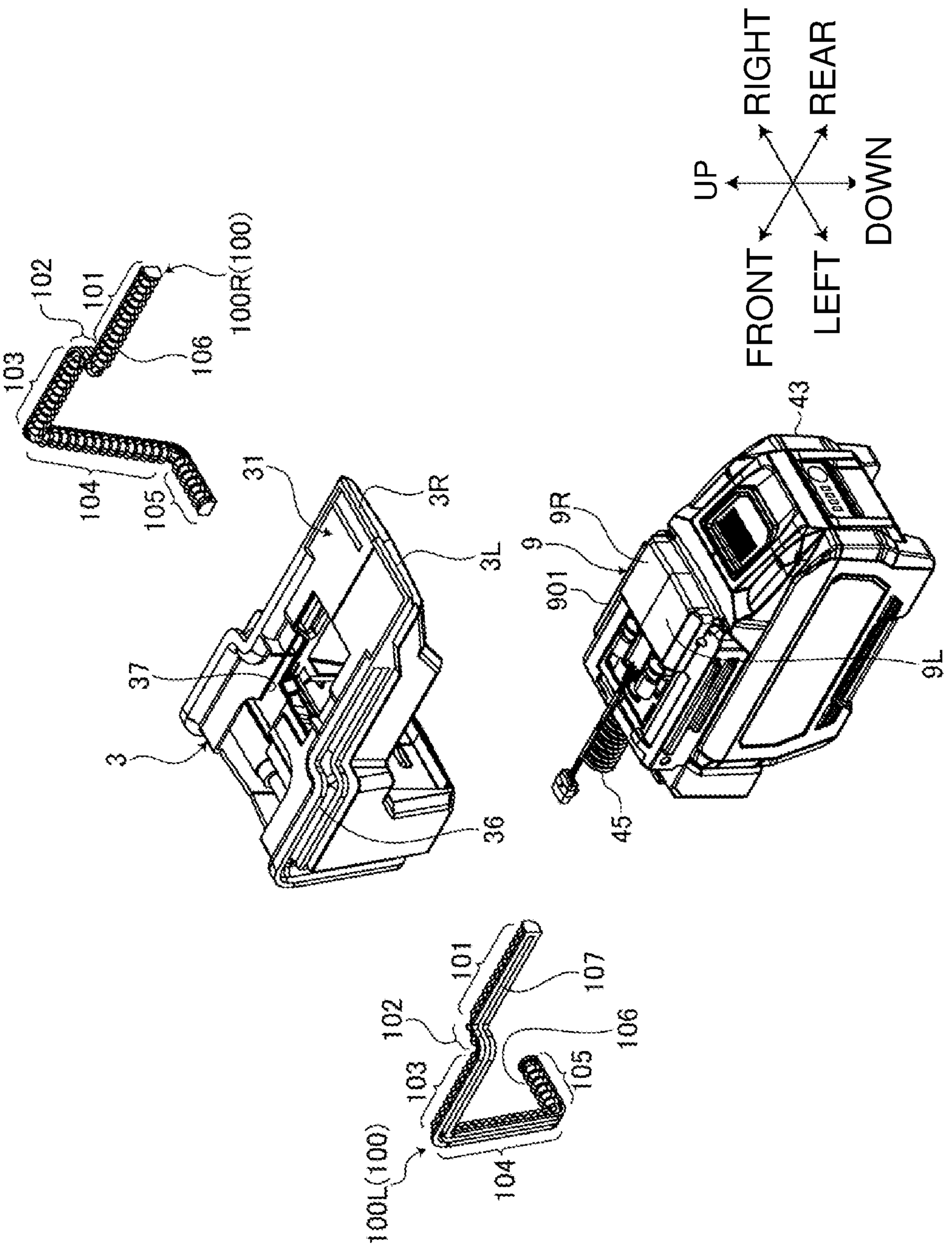
FIG. 29 is an exploded perspective view of the battery housing in the embodiment as viewed from the left rear.
Figure 30:
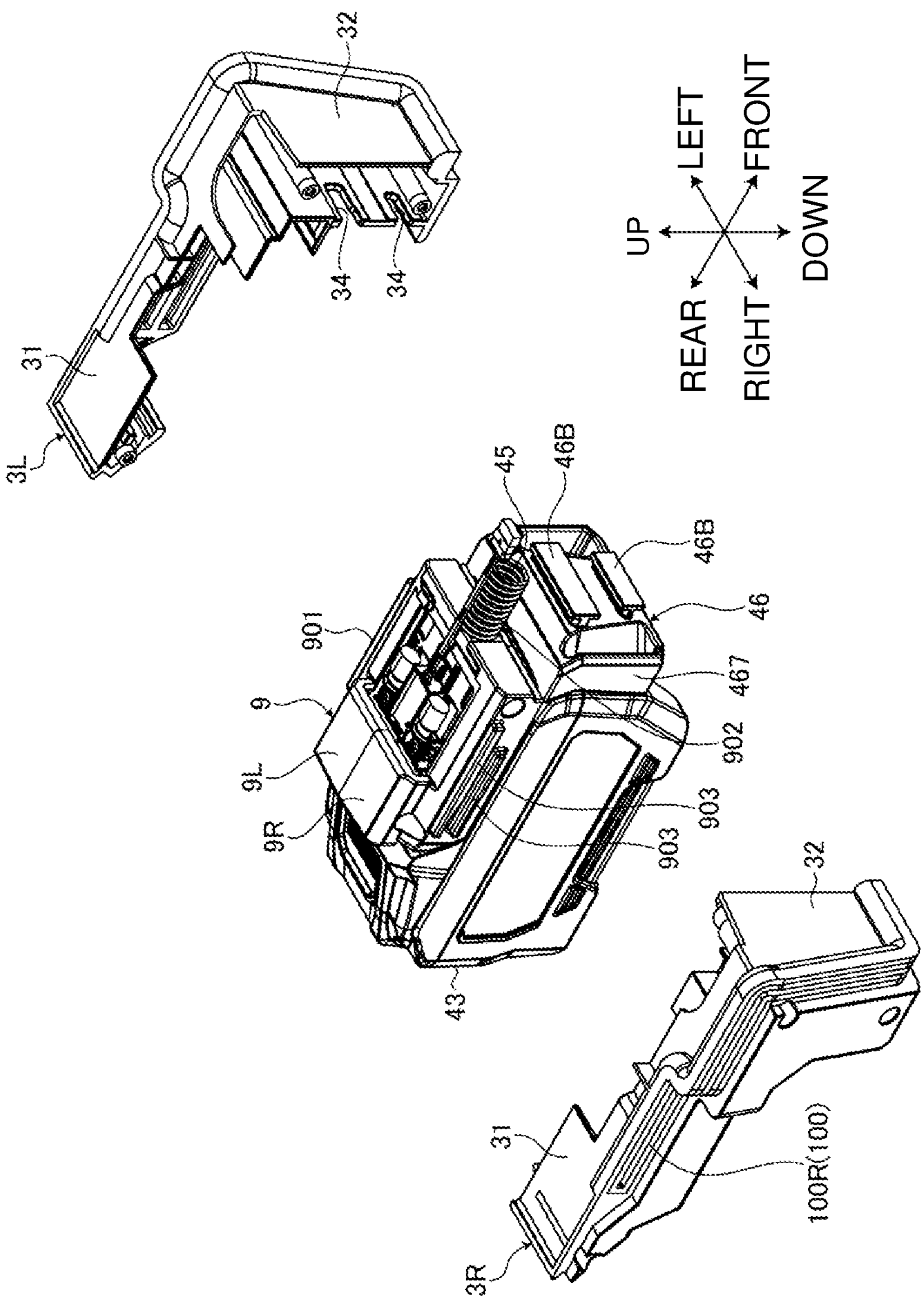
FIG. 30 is an exploded perspective view of the battery housing in the embodiment as viewed from the right front.

FIG. 22 is a partial sectional view of the impact tool 1 according to the embodiment, corresponding to a partially enlarged view of FIG. 9. FIG. 23 is a partial sectional view of the impact tool 1, taken along line C-C in FIG. 3 as viewed in the direction indicated by the arrows. FIG. 24 is an exploded perspective view of the impact tool 1 as viewed from the right front. FIG. 25 is an exploded perspective view of the impact tool 1 as viewed from the left rear. FIG. 26 is a perspective view of the battery housing 3 as viewed from the right front. FIG. 27 is a perspective view of the battery housing 3 as viewed from the left rear. FIG. 28 is an exploded perspective view of the battery housing 3 as viewed from the right front. FIG. 29 is an exploded perspective view of the battery housing 3 as viewed from the left rear. FIG. 30 is an exploded perspective view of the battery housing 3 as viewed from the right front.

The impact tool 1 includes the main housing 2, rubber vibration isolators 100 (first elastic members), the battery housing 3, the battery holder 9, the spring 45, and the rubber buffer 46. The main housing 2 accommodates the motor 10. The rubber vibration isolators 100 are supported by the main housing 2. The battery housing 3 is supported by the rubber vibration isolators 100. The battery holder 9 receives the battery pack 43. The spring 45 and the rubber buffer 46 are supported by the battery housing 3.

The battery housing 3 includes a holder support 31 and an elastic member support 32. The holder support 31 supports the battery holder 9. The elastic member support 32 is located in front of the battery pack 43 attached to the battery holder 9.

The battery housing 3 includes the left battery housing 3L and the right battery housing 3R. The holder support 31 is separately located in the left battery housing 3L and the right battery housing 3R. The battery holder 9 is held between the holder support 31 in the left battery housing 3L and the holder support 31 in the right battery housing 3R.

The battery holder 9 holds the terminal unit 44. The terminal unit 44 includes a terminal plate 44A and terminals 44B. The terminals 44B are fixed to the terminal plate 44A. The terminals 44B protrude downward from the lower surface of the terminal plate 44A. The terminals 44B in the terminal unit 44 are connected to the battery terminals in the battery pack 43. The battery holder 9 holds the terminal plate 44A. The holder support 31 has an opening 37 at the top. The terminal unit 44 is at least partially received in the opening 37. For the terminal unit 44 connected to the controller 11 with lead wires, the lead wires extend through the opening 37.

The battery holder 9 is movably supported by the battery housing 3. The battery holder 9 in the embodiment is supported by the battery housing 3 in a manner movable in the front-rear direction.

The battery holder 9 includes a terminal holder 901, a protrusion 902, and slides 903.

The terminal holder 901 holds the terminal plate 44A. The battery holder 9 in the embodiment includes a left battery holder 9L and a right battery holder 9R. The right battery holder 9R is located on the right of the left battery holder 9L. The left battery holder 9L and the right battery holder 9R form a pair of holder halves. The terminal unit 44 is held between the left battery holder 9L and the right battery holder 9R.

The protrusion 902 protrudes frontward from the front end of the terminal holder 901. The spring 45 is a coil spring. The protrusion 902 is placed inside the spring 45.

The battery housing 3 includes guides 35. The guides 35 guide the slides 903 included in the battery holder 9. The slides 903 are guided by the guides 35 in the battery housing 3 in the front-rear direction. The guides 35 in the embodiment each have a guide groove on the inner surface of the battery housing 3. The slides 903 are movable in the front-rear direction along the guide grooves.

The slides 903 are located on a right portion and a left portion of the terminal holder 901. The guides 35 are located on the holder support 31 and adjacent to the left portion and the right portion of the terminal holder 901. As described above, the battery housing 3 includes the left battery housing 3L and the right battery housing 3R. The guides 35 are located in the left battery housing 3L and the right battery housing 3R.

The spring 45 and the rubber buffer 46 are supported by the elastic member support 32 in the battery housing 3. The elastic member support 32 includes a spring holder 33 and rubber holders 34. The spring holder 33 holds the spring 45. The rubber holders 34 hold the rubber buffer 46.

The spring holder 33 has a recess on the elastic member support 32. The recess is recessed frontward from the rear surface of the elastic member support 32. The spring 45 has a front portion received in the recess and is thus held by the spring holder 33. The protrusion 902 on the battery holder 9 is placed inside the spring 45 through the rear end of the spring 45. The rear end of the spring 45 is supported on the front surface of the terminal holder 901.

The rubber buffer 46 includes a body 46A and protrusions 46B. Each protrusion 46B protrudes frontward from the front surface of the body 46A. The protrusions 46B are two protrusions 46B arranged at an interval in the vertical direction. Each rubber holder 34 has an opening in the elastic member support 32. The protrusions 46B are received in the openings. The rubber buffer 46 is thus held by the rubber holders 34. Each rubber holder 34 (opening) has a portion located in the left battery housing 3L and the other portion located in the right battery housing 3R. With the protrusions 46B placed between the portions of the rubber holders 34 (openings) in the left battery housing 3L and the other portions of the rubber holders 34 (openings) in the right battery housing 3R, the left battery housing 3L and the right battery housing 3R are fastened together with the screws 3S. The protrusions 46B are thus held by the rubber holders 34.

The spring 45 and the rubber buffer 46 each function as a second elastic member that restricts relative movement of the battery housing 3 and the battery pack 43. The spring 45 is a compression spring. The spring 45 urges the battery holder 9 away from the rubber buffer 46.

The battery pack 43 is slid forward along the battery holder 9 from the rear of the battery holder 9 to be attached to the battery holder 9. The rubber buffer 46 is located in front of the battery pack 43. The spring 45 urges the battery holder 9 backward. The battery holder 9 urged backward is at least partially in contact with a rear portion of the holder support 31, thus positioning the battery holder 9 in the front-rear direction.

When receiving no external force in a direction toward the rubber buffer 46, the battery holder 9 is at its initial position under an urging force from the spring 45. The initial position of the battery holder 9 is a position at which the battery holder 9 urged backward is at least partially in contact with the rear portion of the holder support 31. When the battery holder 9 is at the initial position, the rubber buffer 46 and the battery pack 43 are out of contact with each other. When the battery holder 9 receives an external force in the direction toward the rubber buffer 46, the rubber buffer 46 and the battery pack 43 come in contact with each other. More specifically, when the battery holder 9 receives no external force in the direction toward the rubber buffer 46, the spring 45 restricts relative movement of the battery housing 3 and the battery pack 43. When the battery holder 9 receives an external force in the direction toward the rubber buffer 46, the rubber buffer 46 restricts relative movement of the battery housing 3 and the battery pack 43.

The rubber vibration isolators 100 reduce transmission of vibrations from the main housing 2 to the battery housing 3. The rubber vibration isolators 100 function as vibration isolators that reduce vibrations received by the battery housing 3 from the main housing 2. The rubber vibration isolators 100 are located between the main housing 2 and the battery housing 3. The main housing 2 and the battery housing 3 are not in contact with each other with the rubber vibration isolators 100 in between. The battery housing 3 is located between the main housing 2 and the battery holder 9. The battery holder 9 is supported by the main housing 2 with the rubber vibration isolators 100 and the battery housing 3 in between.

The rubber vibration isolators 100 are located on the right and left of the battery housing 3. The rubber vibration isolators 100 include a left rubber vibration isolator 100L and a right rubber vibration isolator 100R. The left rubber vibration isolator 100L is located between the left main housing 2L and the left battery housing 3L. The right rubber vibration isolator 100R is located between the right main housing 2R and the right battery housing 3R.

Each rubber vibration isolator 100 is a rod extending in three directions different from one another. Each rubber vibration isolator 100 includes a first portion 101, a second portion 102, a third portion 103, a fourth portion 104, and a fifth portion 105. The first portion 101 and the third portion 103 extend in the front-rear direction. The third portion 103 is located frontward from the first portion 101. The first portion 101 and the third portion 103 are at different positions in the lateral direction. In the left rubber vibration isolator 100L, the third portion 103 is located leftward from the first portion 101. In the right rubber vibration isolator 100R, the third portion 103 is located rightward from the first portion 101. The second portion 102 extends laterally. The second portion 102 connects the front end of the first portion 101 and the rear end of the third portion 103. The fourth portion 104 extends vertically. The fourth portion 104 extends downward from the front end of the third portion 103. The fifth portion 105 extends laterally. The fifth portion 105 is connected to the lower end of the fourth portion 104. In the left rubber vibration isolator 100L, the fifth portion 105 extends rightward from the lower end of the fourth portion 104. In the right rubber vibration isolator 100R, the fifth portion 105 extends leftward from the lower end of the fourth portion 104.

Each rubber vibration isolator 100 has multiple projections 106 and a holding groove 107. The projections 106 face the battery housing 3. The holding groove 107 faces the main housing 2. The projections 106 are on the first portion 101, the second portion 102, the third portion 103, the fourth portion 104, and the fifth portion 105. The holding groove 107 extends along the first portion 101, the second portion 102, the third portion 103, the fourth portion 104, and the fifth portion 105.

The battery housing 3 has holding recesses 36 to receive the rubber vibration isolators 100. Each holding recess 36 is shaped in conformance with the shape of the corresponding rubber vibration isolator 100 to receive the first portion 101, the second portion 102, the third portion 103, the fourth portion 104, and the fifth portion 105.

The holding recesses 36 are on the left surface of the left battery housing 3L and on the right surface of the right battery housing 3R. The left rubber vibration isolator 100L is received in the holding recess 36 on the left battery housing 3L. The right rubber vibration isolator 100R is received in the holding recess 36 on the right battery housing 3R. The projections 106 are in contact with the inner surfaces of the holding recesses 36. The projections 106 reduce contact areas between the rubber vibration isolators 100 and the battery housing 3.

The main housing 2 includes holding protrusions 28 placed in the holding grooves 107 on the rubber vibration isolators 100. Each holding protrusion 28 is shaped in conformance with the shape of the corresponding rubber vibration isolator 100 to be placed in the holding groove 107 extending along the first portion 101, the second portion 102, the third portion 103, the fourth portion 104, and the fifth portion 105.

The holding protrusions 28 are on the inner surfaces of the left main housing 2L and the right main housing 2R. The holding protrusion 28 on the left main housing 2L protrudes rightward from the inner surface (right surface) of the left main housing 2L. The holding protrusion 28 on the right main housing 2R protrudes leftward from the inner surface (left surface) of the right main housing 2R. The holding protrusion 28 on the left main housing 2L is placed in the holding groove 107 on the left rubber vibration isolator 100L. The holding protrusion 28 on the right main housing 2R is placed in the holding groove 107 on the right rubber vibration isolator 100R.

In the embodiment, the first portion 101, the second portion 102, the third portion 103, the fourth portion 104, and the fifth portion 105 extending in directions different from one another are integral with one another. The first portion 101, the second portion 102, the third portion 103, the fourth portion 104, and the fifth portion 105 may be separate from one another.

Operation of Impact Tool

The operation of the impact tool 1 will now be described. To perform a fastening operation on a workpiece, for example, a socket for the fastening operation is attached to the front end of the anvil 16. The operator then grips the side handle 7 with the left hand and the grip 23 with the right hand, and operates the trigger lever 17A with the right index finger and the right middle finger to move the trigger lever 17A backward. Power is then supplied from the battery pack 43 to the motor 10 to drive the motor 10 and turn on the light assembly 18. As the motor 10 is driven, the rotor 48 and the rotor shaft 49 rotate. A rotational force of the rotor shaft 49 is transmitted to the planetary gears 55P through the first bevel gear 53, the second bevel gear 54, and the sun gear 55S. The planetary gears 55P revolve about the sun gear 55S while rotating and meshing with the internal teeth on the internal gear 55I. The planetary gears 55P are rotatably supported by the spindle 14 with the pin 55A. The revolving planetary gears 55P rotate the spindle 14 at a lower rotational speed than the rotor shaft 49.

When the spindle 14 rotates with the hammer projections 71B and the anvil projections 16C in contact with each other, the anvil 16 rotates together with the hammer 71 and the spindle 14. Thus, the fastening operation proceeds.

When the anvil 16 receives a predetermined or higher load as the fastening operation proceeds, the anvil 16 and the hammer 71 stop rotating. When the spindle 14 rotates in this state, the hammer 71 moves backward. Thus, the hammer projections 71B come out of contact with the anvil projections 16C. The hammer 71 that has moved backward then moves forward while rotating under elastic forces from the first coil spring 73 and the second coil spring 74. The anvil 16 is thus struck by the hammer 71 in the rotation direction. The anvil 16 thus rotates about the output rotation axis AX at high torque. A bolt or a nut is thus tightened at high torque.

In the embodiment, the axial elastic member 91 and the radial elastic member 92 reduce transmission of vibrations from the hammer case 6 to the light emitter unit 90. This reduces, for example, the likelihood that connections between the substrate 95A and the LED chips 95B soldered to each other are damaged, and wires on the substrate 95A are damaged. In other words, this reduces failures in the light emitter unit 90.

The rubber vibration isolators 100 in the embodiment reduce transmission of vibrations from the main housing 2 to the terminal unit 44 and the battery pack 43. Each rubber vibration isolator 100 extends in the three directions that are the front-rear direction, the vertical direction, and the lateral direction, and can thus reduce vibrations applied to the terminal unit 44 and the battery pack 43 in the three directions.

When the impact tool 1 falls and the battery pack 43 hits the floor surface or the ground, the battery holder 9 moves forward, causing the battery pack 43 to come in contact with the rubber buffer 46. This reduces a shock to the battery pack 43.

As described above, the impact tool 1 according to the embodiment includes the motor 10, the main housing 2 accommodating the motor 10, the rubber vibration isolators 100 being first elastic members supported by the main housing 2, the battery housing 3 supported by the rubber vibration isolators 100, the battery holder 9 to which the battery pack 43 is attachable and that is movably supported by the battery housing 3, and the rubber buffer 46 being a second elastic member that restricts relative movement of the battery housing 3 and the battery pack 43 attached to the battery holder 9.

The above structure includes the rubber vibration isolators 100 and the rubber buffer 46 separately. This allows the hardness of the rubber vibration isolators 100 and the hardness of the rubber buffer 46 to be set separately. For example, the hardness of the rubber vibration isolators 100 may be set lower for vibration reduction. The hardness of the rubber buffer 46 may be set higher than the hardness of the rubber vibration isolators 100 for intended shock absorption performance. The rubber vibration isolators 100 isolate the battery pack 43 from vibrations. The rubber buffer 46 reduces a shock to the battery pack 43 when, for example, the impact tool 1 falls.

The rubber buffer 46 in the embodiment is supported by the battery housing 3 and to be in contact with the battery pack 43.

The rubber buffer 46 thus reduces a shock to the battery pack 43 when, for example, the impact tool 1 falls.

The second elastic member in the embodiment includes the spring 45 supported by the battery housing 3. The spring 45 urges the battery holder 9 away from the rubber buffer 46.

This structure causes the battery pack 43 to return to its initial position under an urging force from the spring 45 after the rubber buffer 46 reduces a shock to the battery pack 43 when, for example, the impact tool 1 falls.

In the embodiment, the battery holder 9 is at its initial position under an urging force from the spring 45 when receiving no external force in the direction toward the rubber buffer 46. The rubber buffer 46 and the battery pack 43 attached to the battery holder 9 are out of contact with each other when the battery holder 9 is at the initial position. The rubber buffer 46 and the battery pack 43 attached to the battery holder 9 come in contact with each other when the battery holder 9 receives an external force in the direction toward the rubber buffer 46.

Thus, the spring 45 restricts relative movement of the battery housing 3 and the battery pack 43 when the battery holder 9 receives no external force. The rubber buffer 46 restricts relative movement of the battery housing 3 and the battery pack 43 when the battery holder 9 receives an external force.

The battery pack 43 in the embodiment is slid forward along the battery holder 9 to be attached to the battery holder 9. The rubber buffer 46 is located in front of the battery pack 43.

Thus, when the battery holder 9 receives an external force and moves forward together with the battery pack 43, the rubber buffer 46 reduces a shock to the battery pack 43.

The battery housing 3 in the embodiment includes the guides 35 that guide the slides 903 included in the battery holder 9.

This structure allows the battery holder 9 to move smoothly relative to the battery housing 3.

The battery housing 3 in the embodiment includes the left battery housing 3L and the right battery housing 3R. The guides 35 are located in the left battery housing 3L and the right battery housing 3R.

This structure allows the battery holder 9 to move smoothly relative to the battery housing 3.

The battery holder 9 in the embodiment holds the terminal unit 44 including the terminals 44B connectable to the battery terminals in the battery pack 43.

The rubber buffer 46 reduces a shock to the terminal unit 44.

The battery holder 9 in the embodiment includes the left battery holder 9L and the right battery holder 9R. The terminal unit 44 is located between the left battery holder 9L and the right battery holder 9R.

The terminal unit 44 is thus held by the battery holder 9.

The rubber vibration isolators 100 in the embodiment are each a rod extending in the three directions different from one another.

This reduces vibrations applied to the battery pack 43 in the three directions (the front-rear direction, the vertical direction, and the lateral direction).

The rubber vibration isolators 100 in the embodiment are located between the main housing 2 and the battery housing 3.

This structure reduces transmission of vibrations from the main housing 2 to the battery housing 3.

The rubber vibration isolators 100 in the embodiment have the holding grooves 107. The main housing 2 includes the holding protrusions 28 placed in the holding grooves 107.

The rubber vibration isolators 100 are thus held by the main housing 2.

The battery housing 3 in the embodiment has the holding recesses 36 receiving the rubber vibration isolators 100.

The rubber vibration isolators 100 are thus held by the battery housing 3.

The main housing 2 in the embodiment includes the left main housing 2L and the right main housing 2R. The rubber vibration isolators 100 are located between the left main housing 2L and the battery housing 3 and between the right main housing 2R and the battery housing 3.

This structure effectively reduces transmission of vibrations from the main housing 2 to the battery housing 3.

The impact tool 1 according to the embodiment includes the motor 10, the striker 15 in front of the motor 10, the anvil 16 strikable by the striker 15 in the rotation direction, the D-shaped handle behind the motor 10, the battery holder 9 to which the battery pack 43 is attachable, the battery housing 3 connected to the D-shaped handle and supporting the battery holder 9, and the rubber buffer 46 that is supported by the battery housing 3 and to be in contact with the battery pack 43.

In a large impact tool 1 including the D-shaped handle with the above structure, the rubber buffer 46 reduces a shock to the battery pack 43 when, for example, the impact tool 1 falls.

The battery holder 9 in the embodiment is supported by the battery housing 3 in a manner movable in the front-rear direction.

In the large impact tool 1 including the D-shaped handle, when, for example, the impact tool 1 falls and a shock is applied to the battery pack 43, the battery holder 9 moves to reduce the shock to the battery pack 43.

The impact tool 1 according to the embodiment includes the spring 45 supported by the battery housing 3. The spring 45 urges the battery holder 9 away from the rubber buffer 46.

This structure causes the battery pack 43 to return to the initial position under an urging force from the spring 45 after the rubber buffer 46 reduces a shock to the battery pack 43 when, for example, a large impact tool 1 falls.

The impact tool 1 according to the embodiment includes the motor 10, the main housing 2 accommodating the motor 10, and the battery holder 9 to which the battery pack 43 is attachable. The battery holder 9 is supported by the main housing 2 with the rubber vibration isolators 100 in between. Each rubber vibration isolator 100 is a rod extending in the three directions different from one another and includes the first portion 101 to the fifth portion 105.

The above structure reduces vibrations applied to the battery pack 43 in the three directions (the front-rear direction, the vertical direction, and the lateral direction).

In the embodiment, the first portion 101 to the fifth portion 105 as an elastic member being a rod extending in the three directions different from one another are integral with one another.

The impact tool 1 can be assembled without reducing workability.

The impact tool 1 according to the embodiment includes the battery housing 3 between the main housing 2 and the battery holder 9. The rubber vibration isolators 100 are located between the main housing 2 and the battery housing 3. The battery holder 9 is supported by the main housing 2 with the rubber vibration isolators 100 and the battery housing 3 in between.

This structure effectively reduces vibrations applied to the battery pack 43 in the three directions (the front-rear direction, the vertical direction, and the lateral direction).

OTHER EMBODIMENTS

In the above embodiment, the axial elastic member 91 and the radial elastic member 92 are annular. Multiple axial elastic members 91 may surround the second cylinder 62 at different positions. Multiple radial elastic members 92 may surround the second cylinder 62 at different positions.

The battery holder 9 in the above embodiment includes the left battery holder 9L and the right battery holder 9R located on the right of the left battery holder 9L. In other words, the battery holder 9 is laterally dividable. The battery holder 9 may be vertically dividable.

The impact tool 1 according to the above embodiment is an impact wrench. The impact tool may be an impact driver. The impact driver includes an anvil having an insertion hole to receive a tip tool and a chuck assembly to hold the tip tool.

In the above embodiment, the motor 10 is an inner-rotor brushless motor. The motor 10 may be an outer-rotor brushless motor or a brushed motor.

REFERENCE SIGNS LIST

1 impact tool
2 main housing
2B screw boss
2L left main housing
2R right main housing
2S screw
3 battery housing
3L left battery housing

3R right battery housing
3S screw
4 motor case
4A cylinder
4B lower wall
4C vent
5 gear case
5B screw boss
6 hammer case
6A bearing support surface
6B screw boss
7 side handle
7A handle
7B base
7C first base
7D second base
7E hinge
8 bumper
9 battery holder
9L left battery holder
9R right battery holder
10 motor
11 controller
11A controller case
12 fan
13 reducer
14 spindle
14A flange
14B spindle shaft
14C protruding portion
14D spindle groove
15 striker
16 anvil
16A anvil recess
16B anvil shaft
16C anvil projection
16D first groove
16E second groove
17 trigger switch
17A trigger lever
17B switch body
18 light assembly
19 interface panel
20 hook assembly
20A base
20B ring
21 body
22 protruding portion
23 grip
23A rear grip
23B upper grip
24 controller compartment
25 panel holder
26 inlet
27 outlet
28 holding protrusion
31 holder support
32 elastic member support
33 spring holder
34 rubber holder
35 guide
36 holding recess
37 opening
40 bearing cover
40S screw
41 screw
42 fastening assembly
42A screw
42B dial
43 battery pack
44 terminal unit
44A terminal plate
44B terminal
45 spring
46 rubber buffer
46A body
46B protrusion
47 stator
48 rotor
49 rotor shaft
50 sensor board
51 rotor bearing
52 rotor bearing
53 first bevel gear
54 second bevel gear
55 planetary gear assembly
55A pin
55S sun gear
55P planetary gear
55I internal gear
56 gear bearing
57 gear bearing
58 spindle bearing
61 first cylinder
62 second cylinder
62A groove
63 front wall
71 hammer
71A hammer body
71B hammer projection
71C recess
71D hammer groove
72 ball
73 first coil spring
74 second coil spring
75 third coil spring
76 first washer
77 second washer
78 ball
79 anvil bearing
79A groove
80 O-ring
81 seal
90 light emitter unit
91 axial elastic member
91A axial base
91B cover
91C annular protrusion
91D second axial rib
92 radial elastic member
92A radial base
92B rear support
92C front support
92D radial rib
92E annular protrusion
92F first axial rib
93 washer
94 ring spring
95 chip-on-board light-emitting diode (COB LED)
95A substrate
95B LED chip
95C bank
95D phosphor
95E lead wire

95F recess
96 optical member
96A first outer cylinder
96B second outer cylinder
96C first inner cylinder
96D second inner cylinder
96E light transmitter
96F protrusion
96G snap-fit
100 rubber vibration isolator
100L left rubber vibration isolator
100R right rubber vibration isolator
101 first portion
102 second portion
103 third portion
104 fourth portion
105 fifth portion
106 projection
107 holding groove
901 terminal holder
902 protrusion
903 slide
AX output rotation axis
MX motor rotation axis
VL line

What is claimed is:

1. A power tool, comprising:

a motor;

a main housing accommodating the motor;

a first elastic member supported by the main housing;

a battery housing supported by the first elastic member;

a battery holder to which a battery pack is attachable, the battery holder being movably supported by the battery housing; and a second elastic member configured to restrict relative movement of the battery housing and the battery pack attached to the battery holder, wherein the second elastic member includes a rubber buffer supported by the battery housing and to be in contact with the battery pack, and the second elastic member includes a spring supported by the battery housing, and the spring urges the battery holder away from the rubber buffer.

2. The power tool according to claim 1, wherein the battery holder is at an initial position under an urging force from the spring when receiving no external force in a direction toward the rubber buffer, the rubber buffer and the battery pack attached to the battery pack are out of contact with each other when the battery holder is at the initial position, and the rubber buffer and the battery pack attached to the battery holder come in contact with each other when the battery holder receives an external force in the direction toward the rubber buffer.

3. The power tool according to claim 2, wherein the battery pack is slid forward along the battery holder to be attached to the battery holder, and the rubber buffer is located in front of the battery pack.

4. The power tool according to claim 1, wherein the battery housing includes a guide to guide a slide included in the battery holder.

5. The power tool according to claim 4, wherein the battery housing includes a left battery housing and a right battery housing, and the battery housing includes a plurality of the guides including a guide in the left battery housing and a guide in the right battery housing.

6. The power tool according to claim 5, wherein the battery holder holds a terminal unit including a terminal connectable to a battery terminal in the battery pack.

7. The power tool according to claim 6, wherein the battery holder includes a left battery holder and a right battery holder, and the terminal unit is located between the left battery holder and the right battery holder.

8. The power tool according to claim 1, wherein the first elastic member is a rod extending in three directions different from one another.

9. The power tool according to claim 1, wherein the first elastic member is located between the main housing and the battery housing.

10. The power tool according to claim 9, wherein the first elastic member has a holding groove, and the main housing includes a holding protrusion placed in the holding groove.

11. The power tool according to claim 10, wherein the battery housing has a holding recess receiving the first elastic member.

12. The power tool according to claim 9, wherein the main housing includes a left main housing and a right main housing, and the power tool comprises a plurality of the first elastic members including a first elastic member located between the left main housing and the battery housing and a first elastic member located between the right main housing and the battery housing.

13. The power tool according to claim 1, further comprising:

a striker in front of the motor;

an anvil strikable by the striker in a rotation direction; and a D-shaped handle behind the motor;

wherein the battery housing is connected to the D-shaped handle, and the battery housing supports the battery holder.

14. The power tool according to claim 13, wherein the battery holder is supported by the battery housing in a manner movable in a front-rear direction.

15. The power tool according to claim 13, further comprising:

a spring supported by the battery housing, the spring urging the battery holder away from the second elastic member.

16. The power tool according to claim 1, wherein the first elastic member includes a first rod member, a second rod member and a third rod member, and the first elastic member is a single component.

17. The power tool according to claim 16, wherein the battery housing is located between the main housing and the battery holder, and the battery holder is supported by the main housing with the first elastic member and the battery housing in between.

* * * * *